(12) United States Patent
Amagai et al.

(10) Patent No.: US 10,608,210 B2
(45) Date of Patent: *Mar. 31, 2020

(54) FLAT BATTERY AND METHOD FOR PRODUCING FLAT BATTERY

(71) Applicant: Nissan Motor Co., Ltd., Yokohama, Kanagawa (JP)

(72) Inventors: Ryuichi Amagai, Isehara (JP); Kenichi Ochiai, Atsugi (JP); Masakazu Shibuya, Fuji (JP)

(73) Assignee: Envision AESC Japan Ltd., Zama (JP)

( * ) Notice: Subject to any disclaimer, the term of this patent is extended or adjusted under 35 U.S.C. 154(b) by 919 days.

This patent is subject to a terminal disclaimer.

(21) Appl. No.: 14/357,789

(22) PCT Filed: Nov. 6, 2012

(86) PCT No.: PCT/JP2012/078689
§ 371 (c)(1),
(2) Date: May 13, 2014

(87) PCT Pub. No.: WO2013/080755
PCT Pub. Date: Jun. 6, 2013

(65) Prior Publication Data
US 2014/0302383 A1    Oct. 9, 2014

(30) Foreign Application Priority Data

Nov. 29, 2011  (JP) ................. 2011-259823

(51) Int. Cl.
*H01M 2/02*  (2006.01)
*H01M 10/04*  (2006.01)
*H01M 2/10*  (2006.01)

(52) U.S. Cl.
CPC ......... *H01M 2/024* (2013.01); *H01M 2/1077* (2013.01); *H01M 2/1083* (2013.01);
(Continued)

(58) Field of Classification Search
None
See application file for complete search history.

(56) References Cited

U.S. PATENT DOCUMENTS

2004/0038125 A1* 2/2004 Kim ............... H01M 2/021
                                                                 429/162
2007/0207377 A1   9/2007 Han et al.
(Continued)

FOREIGN PATENT DOCUMENTS

CN    1846902 A    10/2006
EP    2579354 A1   4/2013
(Continued)

OTHER PUBLICATIONS

The Extended European Search Report for the corresponding European patent application No. 12854082.0 dated Apr. 14, 2015.

*Primary Examiner* — Ula C Ruddock
*Assistant Examiner* — Anna Korovina
(74) *Attorney, Agent, or Firm* — Global IP Counselors, LLP

(57) ABSTRACT

A flat battery basically comprises a battery body, a plate-shaped member and an elastic member. The battery body includes a power generation unit and a case member encasing and sealing the power generation unit therein. The plate-shaped member is configured to be disposed between an outer periphery portion of the battery body and an outer periphery portion of an adjacent battery body stacked that is to be stacked on the battery body. The elastic member joins the battery body and the plate-shaped member to connect the battery body and the plate-shaped member, and covers at least part of the plate-shaped member. The plate-shaped member includes an exposed part which is exposed from part of an end surface of the elastic member which covers the plate-shaped member in a thickness direction of the battery body.

19 Claims, 21 Drawing Sheets

(52) U.S. Cl.
CPC .... *H01M 10/0413* (2013.01); *H01M 2220/20* (2013.01); *Y10T 29/4911* (2015.01)

(56) References Cited

U.S. PATENT DOCUMENTS

| | | | |
|---|---|---|---|
| 2007/0231685 A1* | 10/2007 | Takeuchi | H01M 2/0275 429/163 |
| 2008/0138698 A1* | 6/2008 | Ogami | H01M 2/1061 429/91 |
| 2009/0023059 A1 | 1/2009 | Kinoshita et al. | |
| 2009/0208828 A1* | 8/2009 | Kanai | H01G 9/12 429/120 |
| 2009/0325053 A1* | 12/2009 | Koetting | H01M 2/08 429/120 |
| 2010/0086842 A1* | 4/2010 | Yang | H01M 2/1061 429/163 |
| 2011/0256446 A1* | 10/2011 | Bronczyk | H01M 2/1077 429/163 |
| 2013/0229147 A1 | 9/2013 | Amagai et al. | |

FOREIGN PATENT DOCUMENTS

| | | |
|---|---|---|
| JP | 6-79516 U | 11/1994 |
| JP | 2006-100064 A | 4/2006 |
| JP | 2006-114406 A | 4/2006 |
| JP | 2007-73510 A | 3/2007 |
| JP | 2008-147045 A | 6/2008 |
| JP | 2008-186750 A | 8/2008 |
| JP | 2010-157417 A | 7/2010 |
| WO | 2006/038697 A1 | 4/2006 |
| WO | 2012/066882 A1 | 5/2012 |

* cited by examiner

FLAT BATTERY AND METHOD FOR PRODUCING FLAT BATTERY

CROSS-REFERENCE TO RELATED APPLICATIONS

This application is a U.S. National stage application of International Application No. PCT/JP2012/078689, filed Nov. 6, 2012, which claims priority to Japanese Patent Application No. 2011-259823 filed in Japan on Nov. 29, 2011, the contents of which are hereby incorporated herein by reference.

BACKGROUND

Field of the Invention

The present invention relates to a flat battery and a method for producing the flat battery.

Background Information

Known in the art is a flat secondary battery cell which has a case member made of laminated film sheets wherein a plastic frame member is attached around the periphery of the case member to improve both the mechanical rigidity of the case member and the sealing force around the periphery of the case member (Japanese Patent Application Publication No. 2007-73510 A).

SUMMARY

However, the secondary battery cell in the above described conventional technique is structured with an outer circumferential seal part of the case member inserted into a fastening groove of the frame member (see the "elastic fastening" in paragraph [0041] of Japanese Patent Application Publication No. 2007-73510 A). Thus, for example, when applied to a vehicle, there is the problem that the vibration of the vehicle may be transmitted through the frame member to the secondary battery cell to lower durability of the secondary battery cell.

The object to be solved by the present invention resides in providing a flat battery that is prevented from the durability of the second battery being deteriorated due to vibrations and the like of a vehicle.

The present invention solves the above problem, and is provided with a battery body comprising a case member made of sheets of laminate film containing a resin layer, inside of which a power generation unit is sealed, a plate shaped member which is, when another battery body is stacked adjacent to each other, disposed between outer circumferential portions of adjacent battery bodies, and an elastic member which join the battery body and the plate shaped member to connect the battery body and the plate shaped member.

According to the present invention, even when an external force such as the vibration of a vehicle is applied to the plate shaped member, the elastic member exerts a buffering force to suppress degradation in the durability of the flat battery.

BRIEF DESCRIPTION OF THE DRAWINGS

Referring now to the attached drawings which form a part of this original disclosure.

DETAILED DESCRIPTION OF THE EMBODIMENTS

First Embodiment

Figure 1:
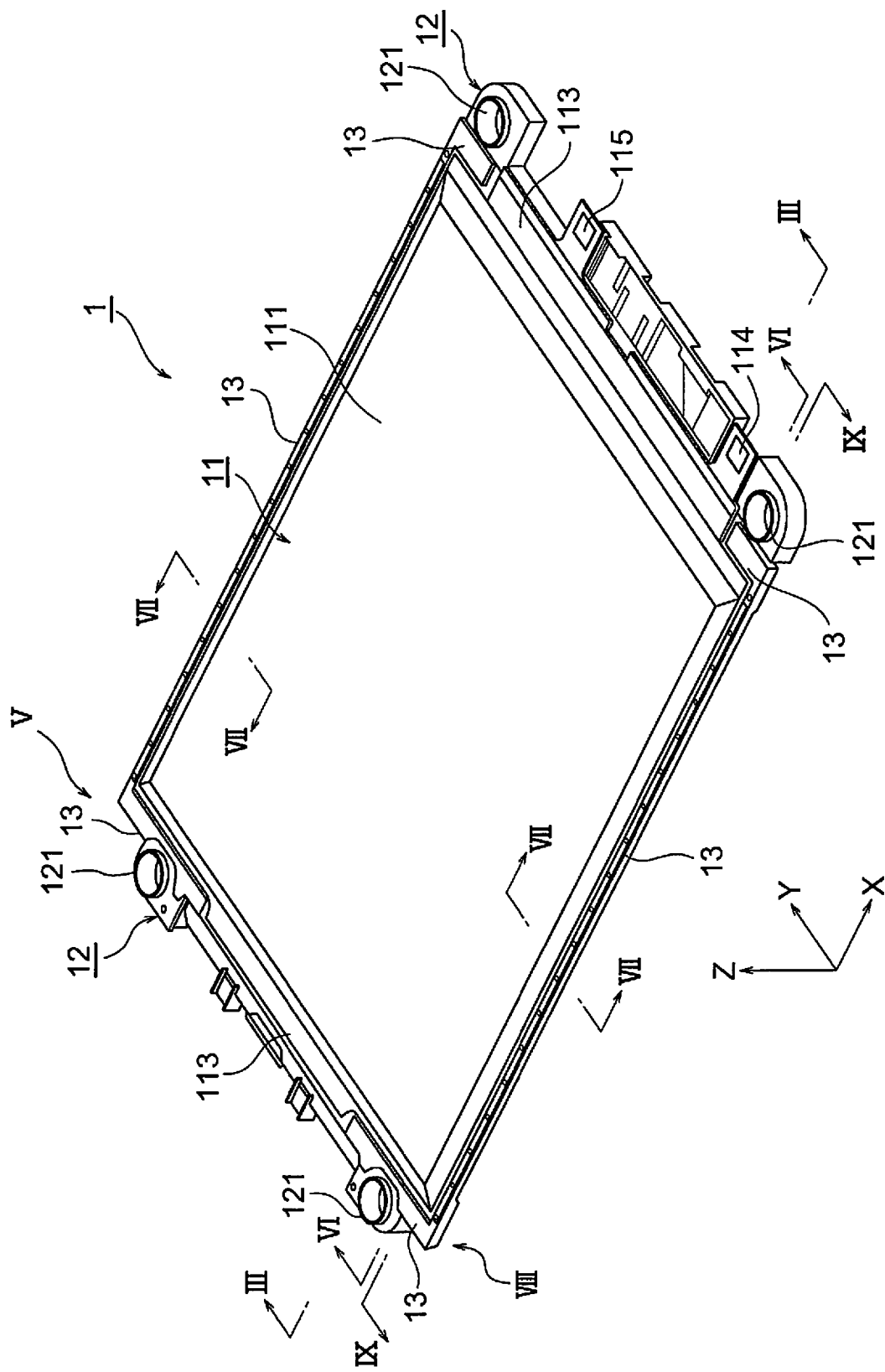
FIG. 1 is a perspective view which shows a secondary battery cell pertaining to an embodiment according to the present invention.
Figure 2:
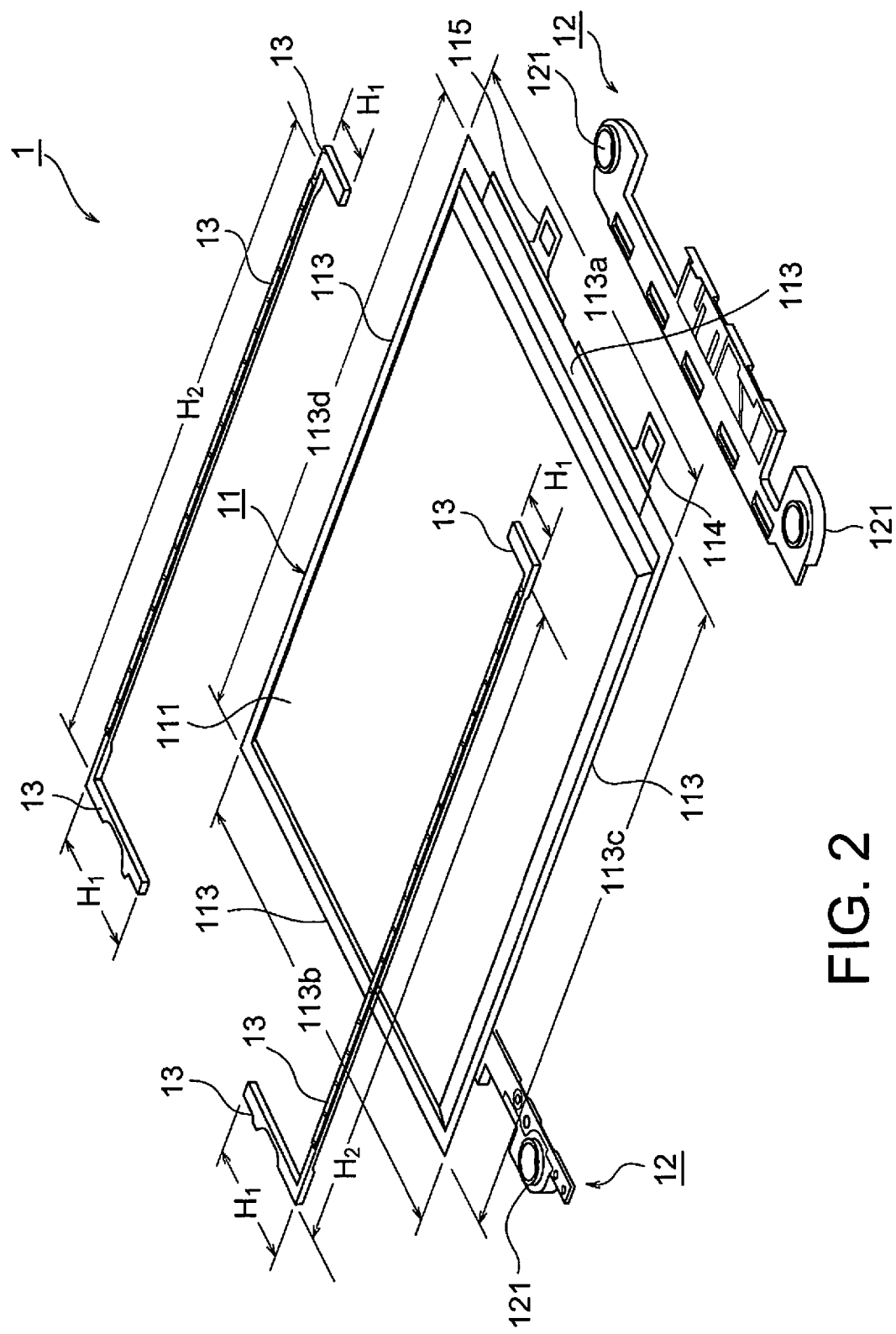
FIG. 2 is an exploded perspective view which shows the main configuration of the secondary battery cell of FIG. 1.
Figure 3:
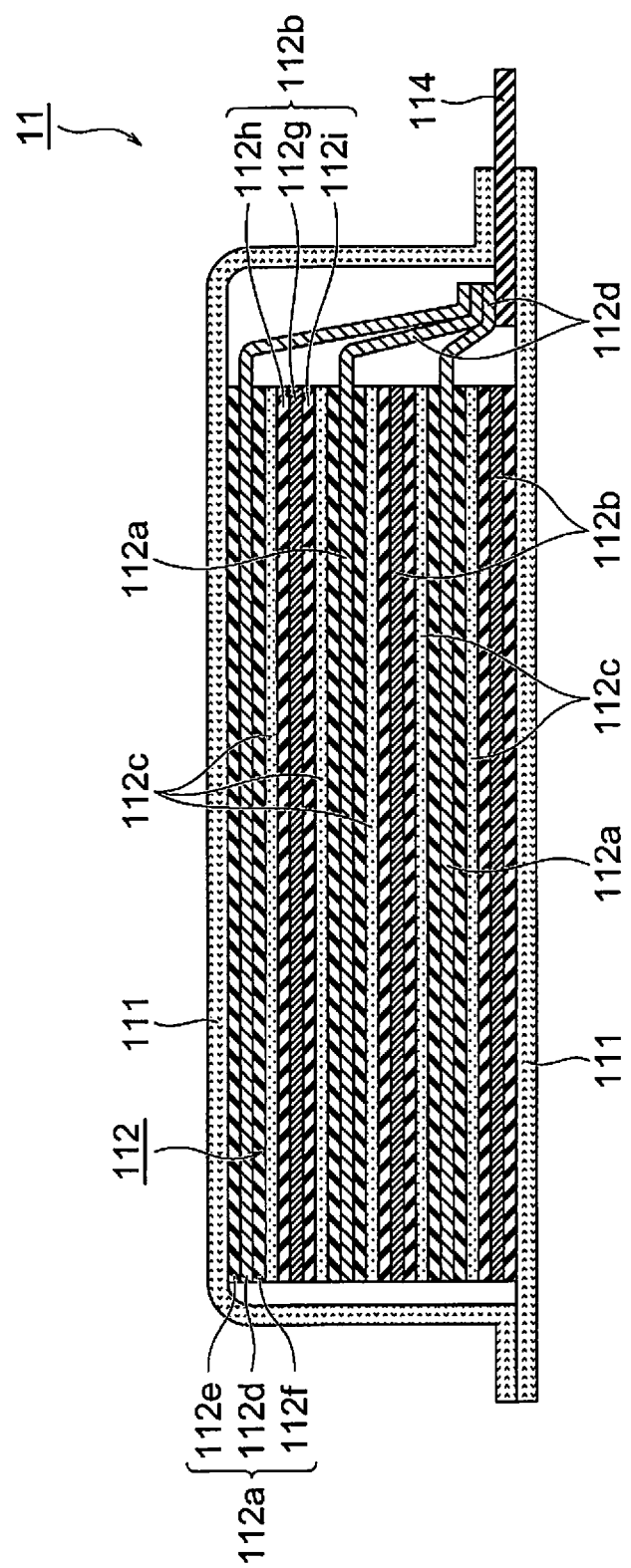
FIG. 3 is a cross-sectional view along the line III-III in FIG. 1.

FIG. 1 is a perspective view which shows a state of a completed secondary battery cell in an embodiment according to the present invention, while FIG. 2 is an exploded perspective view which shows a state in which the secondary battery cell is disassembled into its main components. FIG. 3 is a cross-sectional view along the line III-III in FIG. 1. As shown in FIG. 1 and FIG. 2, the secondary battery cell 1 in the present embodiment comprises a thin, flat battery body 11, a spacer 12, and a resin portion 13 which is formed in an area surrounding the battery body and the spacer.

The battery body 11 includes a case or exterior member 111 made of laminated film sheets and a power generation unit 112 which is housed inside the exterior member. The detailed structure of the generation unit 112 is shown in details in FIG. 3. The laminated films which form the case or exterior member 111 is, for example, made a three-layer structure (see an extracted cross-sectional view A in FIG. 6,) which has, from the inside toward the outside of the secondary battery cell 1, an inside resin layer 111a, an intermediate metal layer 111b, and an outside resin layer 111c. The inside resin layer 111a is, for example, a film which is formed from polyethylene, modified polyethylene, polypropylene, modified polypropylene, an ionomer, or other resin or a synthetic resin of the these. The intermediate metal layer 111b is formed by an aluminum or other metal foil. The outside resin layer 111c is, for example, formed from a polyamide-based resin, a polyester-based resin, or other resin film which is superior in electrical insulation.

As described, the case member 111 is formed of laminated films (film-shaped member) formed by a resin-metal film laminate or other laminate film which is flexible and is obtained by laminating one surface of an intermediate metal layer 111b (inside surface of secondary battery cell 1) by polyethylene or another resin and laminating the other surface (outside surface of secondary battery cell 1) by a polyamide based resin or a polyester-based resin.

The case member 111 can be improved in its strength by having an intermediate metal layer 111a in addition to an inside and outside resin layers 111a, 111c. Further, when the inside resin layer 111a of the laminate films is formed, for example, by polyethylene or another resin, good adhesiveness between the inside resin layer 111a and the metal electrode terminals 114, 115 may be ensured.

Note that, the laminate film according to the present invention is not limited to the above described three-layer structure. It may also be a single-layer structure formed of any one of the inside and outside resin layers 111a, 111c. Further, it may also be a two-layer structure of any one of the inside and outside resin layers 111a, 111c with the intermediate metal layer 111b. Furthermore, it may also be a structure of four or more layers when required.

The case member 111 includes a pair of laminate film bodies each having laminate films. The one laminate film body is formed into a shallow bowl (dish shaped) from a rectangular flat sheet so as to accommodate the power generation unit 112. After placing the power generation unit 112 with an electrolyte liquid inside, the other laminate film body covers to superpose respective outer periphery portions 113 so that the entire extents of the outer periphery portions 113 are joined together by hot bonding or adhesive to form a joined part.

The secondary battery cell 1 of the present embodiment is a lithium ion secondary battery cell. As shown in FIG. 3, the power generation unit 112 includes a positive plate 112a and a negative plate 112b with a separators 112c interposed therebetween. The power generation unit 112 of the present embodiment has three positive plates 112a, five separators 112c, three negative plates 112b, and an electrolyte (not shown specifically). Note that, the secondary battery 1 according to the present invention is not limited to a lithium ion secondary but may be of another type of battery as well.

The positive electrode plate 112a which forms the power generation unit 112 has a positive electrode current collector 112d which extends up to a positive terminal 114 and positive layers 112e, 112f each being formed partly on both main surfaces of the positive current collector 112d.

The positive current collector 112d of the positive plate 112a is formed, for example, by aluminum foil, aluminum alloy foil, copper foil, nickel foil, or other electrochemically stable metal foil. Further, the positive layers 112e, 112f of the positive plate 112a are obtained, for example, by mixing positive active material including lithium-nickel dioxide (LiNiO2), lithium-manganese dioxide (LiMnO2), lithium-cobalt dioxide (LiCoO2), or other lithium composite oxides and chalcogen (S, Se, Te) compounds etc., carbon black or another conducting agent, an aqueous dispersion of polytetrafluoroethylene or another adhesive, and a solvent, coating on the two main surfaces of the positive current collector 112d, and subsequently drying and rolling.

The negative plate 112b which forms the power generation unit 112 has a negative current collector 112g which extends up to the negative terminal 115 and negative layers 112h, 112i which are formed partly on both main surfaces of the negative current collector 112g.

The negative current collector 112g of the negative plate 112b is formed, for example, by nickel foil, copper foil, stainless steel foil, iron foil, or other electrochemically stable metal foil. Further, the negative layers 112h, 112i of the negative plate 112b use, for example, amorphous carbon, non-graphitizable carbon, graphitizable carbon, graphite, or another negative electrode active material which adsorbs and releases lithium ions of the above described positive active materials. Further, the negative active component layer is obtained by mixing an aqueous dispersion of a styrene-butadiene rubber resin powder as a precursor material of an organic fired body, carbonizing the fired styrene-butadiene rubber, and crushing the obtained fired material so as to obtain carbon particles carrying carbonized styrene-butadiene rubber on their surfaces. Further, the layer is formed, while using this as the main material, by further mixing an acryl resin emulsion or other binding agent, coating this mixture on the two main surfaces of the negative current collector 112g, and subsequently drying and rolling.

The separator 112c which is interposed or stacked between the positive plate 112a and the negative plate 112b prevents short-circuiting between the positive plate 112a and the negative plate 112b, and may also be provided with the function of holding an electrolyte. The separator 112c is, for example, a microporous film which is formed by polyethylene, polypropylene, other polyolefin, etc. If an overcurrent flows, heat generation closes the voids or pores in the layer and the separator functions to cut off current. Note that the separator 112c is not limited to a polyolefin or other single-layer film. A three-layer structure comprised of a polypropylene film sandwiched by polyethylene films or a laminate of a polyolefin micro-porous film and organic nonwoven fabric, etc. may also be used. By making the separator 112c as a multilayer structure in this way, it is possible to impart functions to the separator 112c such as the function of preventing overcurrent, various functions are imparted to the separator such as the overcurrent blocking function, an electrolyte holding function, and shape holding (rigidity improving) function, etc.

The above described power generation unit 112 includes the positive plates 112a and the negative plates 112b alternately stacked through the separators 112c. Further, three positive plates 112a are respectively connected to a metal foil positive terminal 114. Further, while not shown in FIG. 3, three negative plates 112b are connected respectively to a metal foil negative terminal 115.

As shown in FIG. 1, the positive terminal 114 and the negative terminal 115 are led out from the positive plates 112a and the negative plates 112b of the power generation unit 112 to the outside of the case member 111. In the secondary battery cell 1 in the present embodiment, both the positive terminal 114 and the negative terminal 115 are led out side by side from the one side of the outer periphery portion 113a (from the short side in front of FIG. 1) of the case member 111. The positive terminal 114 and the negative terminal 115 are also referred to as a "positive tab 114" and a "negative tab 115", respectively.

The secondary battery cell 1 of the present embodiment has the positive terminal 114 and the negative terminal 115 led out side by side from the one side of the outer circumference of the case member 111. FIG. 3 shows a cross-sectional view extending between the positive plates 112a of the power generation unit 112 to the positive terminal 114, and omits the cross-sectional view extending from the negative plates 112b of the power generation unit 112 to the negative terminal 115. However, the negative plates 112b and the negative terminal 115 are structured similarly to the positive plates 112a and the positive terminal 114 which are shown in the cross-sectional view of FIG. 3. However, the positive plates 112a (positive current collectors 112d) and the negative plates 112b (negative current collectors 112g) extending from the end part of the power generation unit 112 to the positive terminal 114 and the negative terminal 115 respectively are cut away by half or less so as not to contact each other in a plan view.

The battery body 11 is shaped rectangular in a plan view. The outer periphery portion 113 that is joined to seal the inside by joining the pair of laminate film bodies (film-shaped members) of the case member 111 is now referred to as the outer periphery portions 113a to 113d. Note that the outer shape of the battery body 11 is not limited to a rectangular shape. It may also be formed to a square shape or other polygonal shape. Further, the led-out positions of the positive terminal 114 and the negative terminal 115 may be on the same outer periphery portion 113a as in the present example. Alternatively, they may be led out from the opposing outer periphery portions, such as 113a, 113b, or 113c, 112d. Also, they may be led out from the long side outer periphery portion 113c, 113d.

The battery body 11 configured in the manner described above can be used alone, but may be used in connection with one or more of the other secondary battery cells to obtain the secondary battery (hereinafter, also referred to as battery module) with a desired output power or capacity. Further, a plurality of these battery modules may be connected to form a pack (battery pack) to be installed on an electric vehicle or a hybrid vehicle as a propulsion source.

Figure 4:
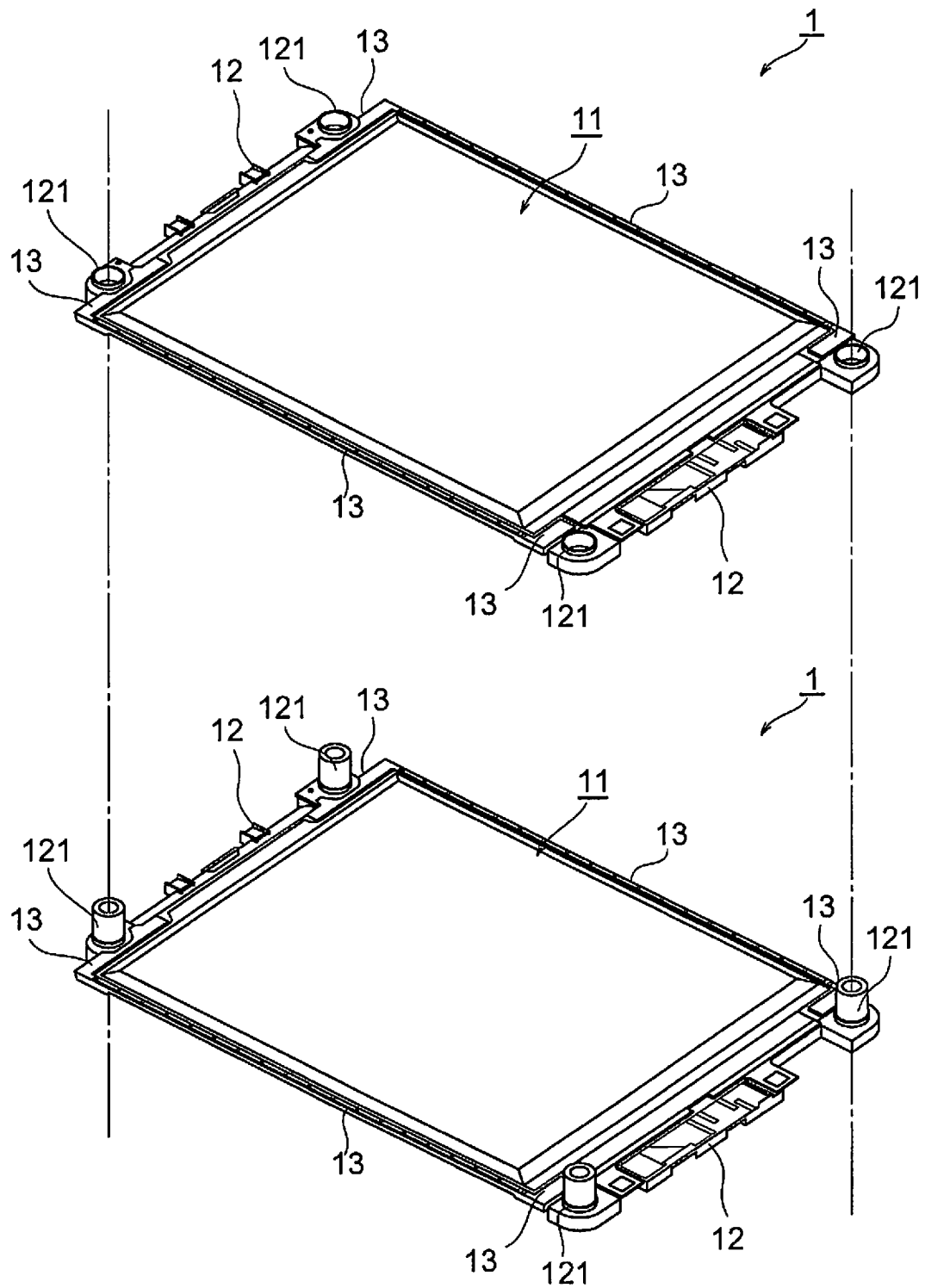
FIG. 4 is a perspective view which shows the state in which the secondary battery cell of FIG. 1 stacked with another secondary battery cell.

When constructing a battery module by connecting a plurality of the battery bodies 11 together, as shown in FIG. 4, it is practical that the plurality of the battery bodies 11 are stacked with their main surfaces facing each other and housed in a battery case. FIG. 4 is a perspective view which shows a state in which one of the secondary battery cells 1 is stacked on another secondary battery cell 1. In this case, in order to secure the insulation between the positive terminal 114 and negative terminal 115 which are led out from the outer periphery portion 113a of the battery body 11 and the positive terminal 114 and the negative terminal 115 which are led out from the outer periphery portion 113a of another battery body 11 which is stacked on this battery body 11, and in order to arrange bus-bars for connecting these positive terminals 114 and the negative terminals 115 in series and/or in parallel or arrange a connector of a voltage detection sensor, the spacer 12 is used that includes a plate-shaped member of outer configuration (plate-shaped member) made from an insulating material.

The spacer 12, in the present embodiment, as shown in FIG. 1, FIG. 2, and FIG. 4, is arranged or disposed between the outer periphery portions 113a of the adjacent battery bodies 11 and protrudes out from between the outer periphery portions 113a of the adjacent battery bodies 11 toward the outer periphery. The spacer 12 also has fastening parts 121 for fastening the battery bodies 11 to the case of the battery module or chassis of the automobile or other predetermined installation position.

The spacer 12 is formed from polybutylene terephthalate (PBT), polypropylene (PP), or other insulating resin material which has rigidity and is formed into an elongate shape which has a length equal to or longer than the length of the outer periphery portion 113a of the battery body 11. Further, the fastening parts 121 are formed at both ends, each being comprised of a sheath-shaped through hole. Note that the length of the spacer 12 is preferably measured to be equal to or longer than the length of the outer periphery portion 113a to which the spacer 12 is attached. This is intended to have an external force received by the spacer 12 as a whole and to prevent a local stress from acting on the battery body 11. Therefore, the length of the spacer 12 need only to be dimensioned as close as possible to the length of the outer periphery portion 113a to be attached.

Figure 6:
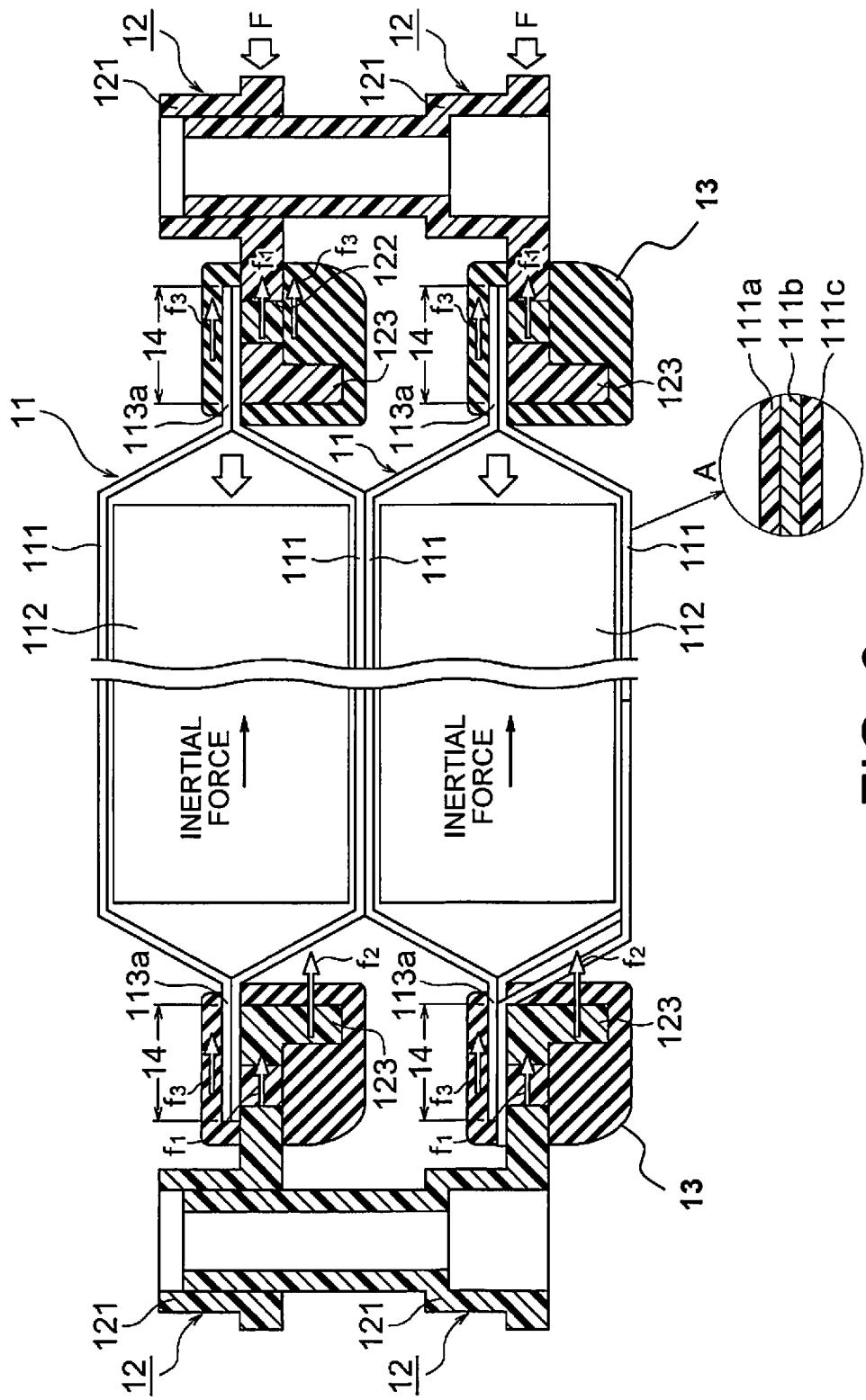
FIG. 6 is a cross-sectional view along the line VI-VI in FIG. 1.

Further, the mechanical strength (bending strength or buckling strength or other rigidity) of the above described PBT or PP spacer 12 is preferably made greater than the mechanical strength of the electrode plates which form the power generation unit 112 housed in the battery body 11 (the above described positive plates 112a and negative plates 112b). In particular, the mechanical strength of the spacer with respect to the direction of application of external force F which is shown in FIG. 6 is preferably set greater. By making the spacer 12 harder to crush or collapse, the shape holding stability of the secondary battery cell 1 is secured, when a remarkably excessive external force acts on the spacers 12 at the vehicle-mounted secondary battery cell 1 to cause the spacer 12 and the power generation unit 112 to contact each other to thereby crush both components.

Figure 5:
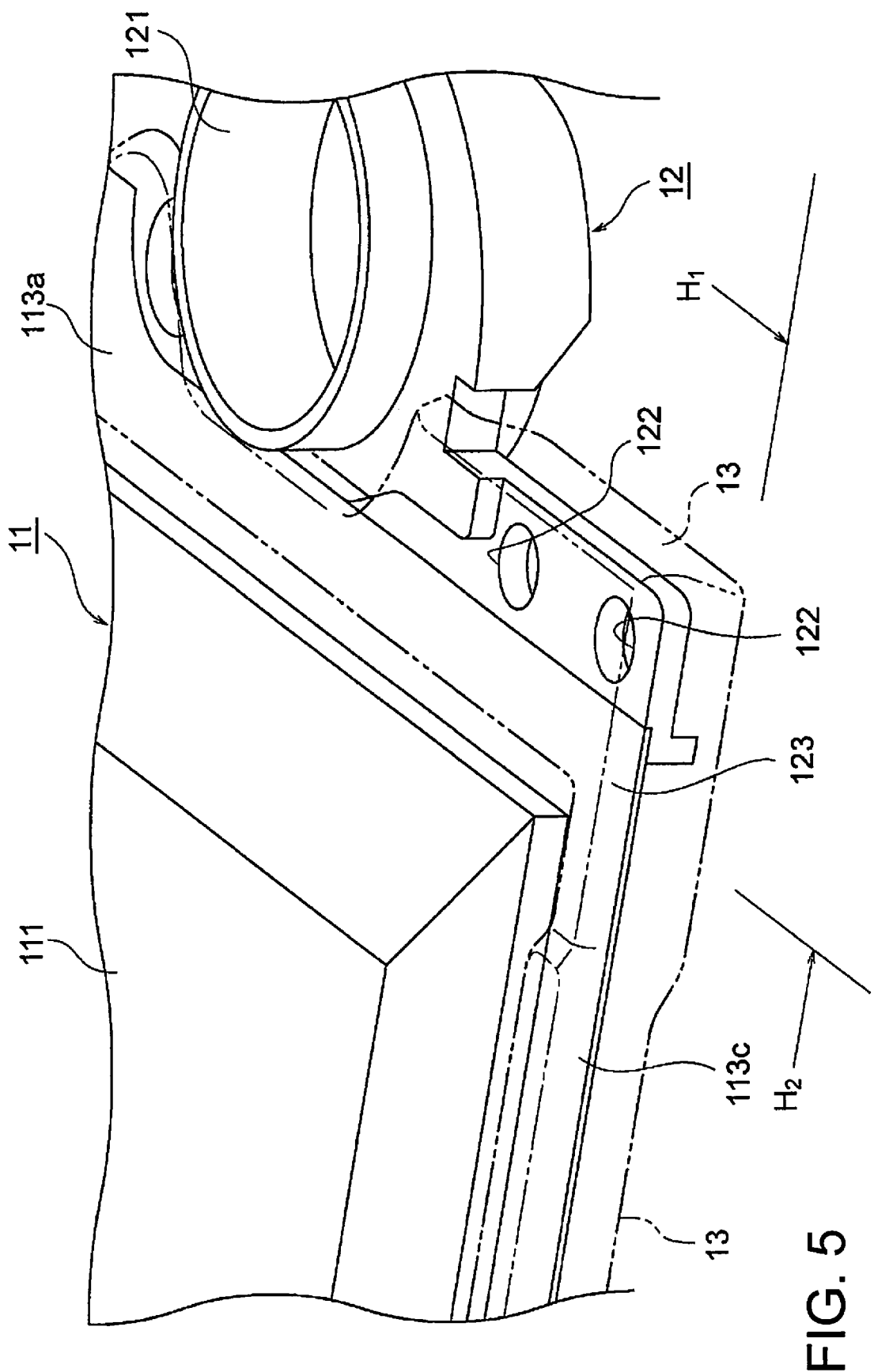
FIG. 5 is a view along the arrow V in FIG. 1.

Near the fastening parts 121 of the spacer 12 in the present example, a through hole 122 and rib 123 are formed. FIG. 1, FIG. 2, and FIG. 4 omit illustrations of these, while FIG. 5 and FIG. 6 show the through holes 122 and the ribs 123. FIG. 5 is a view along the arrow V in FIG. 1. FIG. 6 is a cross-sectional view along the line VI-VI in FIG. 1. The through hole 122 in the present embodiment is formed at a suitable location around the fastening part 121 at both ends of the spacers 12. Further, the rib 123 of the present embodiment is formed at the bottom end so as to protrude downward.

The through hole 122 and the rib 123 of the present embodiment are embedded an elastic resin part 13 detailed below. It is sufficient that they have a surface which causes generation of buffering forces by the elastic resin part 13 when the external force applied to the fastening part 121 of the spacers 12 is applied through the elastic resin part 13 to the battery body 11. More specifically, they may be a through hole, a rib, or a recess which has a surface facing the direction of application of external force F shown in FIG. 6. As explained below, even if the through hole, ribs, or recess is not provided, a buffer force against the external force F is produced in the elastic resin part 13 itself. However, by providing the through hole, rib, or recess, as shown in the figure, the buffering forces f1, f2 with respect to the external force F become larger, so that the external force F which acts on the battery body 11 can be buffered more effectively. In this sense, the through hole 122 and the rib 123 are also referred to as a "reinforcing parts".

In the secondary battery cell 1 of the present embodiment, the elastic resin part 13 is formed by insert molding an elastic resin in the surroundings of the outer periphery portion 113 of the battery body 11, in a range including the overlapping area 14 between the outer periphery portion 113 and the spacer 12 in the cross-sectional view of FIG. 6.

The elastic resin part 13 is formed from vulcanized rubber, a heat curable resin elastomer, thermoplastic resin elastomer, polyamide-based resin (hot melt grade), or other elastic resin and is formed in the above described range by the insert molding described below. In the present embodiment, as shown in FIG. 2, the elastic resin part 13 is formed, in the range other than the surrounding H1 of the fastening part 121, also in the range H2 extending the outer periphery portions 113c, 113d (long side outer periphery) of the battery body 11. Note that the elastic resin part 13 may also be formed over the entire range of the outer periphery portion 113.

The elastic resin part 13 formed in the range H1 shown in FIG. 2, as shown in the cross-sectional view of FIG. 6, surrounds the overlapping area 14 between the outer periphery portion 113a of the battery body 11 and the spacers 12, and join the outer periphery portion 113a and spacer 12 to thereby connect the spacer 12 and the battery body 11. Further, the through hole 122 formed in the spacer 12 is also filled with elastic resin. Further, when an external force F such as vehicle vibration applied to the fastening part 121 of the spacers 12 is applied to the outer periphery portion 113a of the battery body 11, buffer forces f3, f1, and f2 are generated in the elastic resin part 13 itself, or at the through hole 122 or the rib 123.

As shown in FIG. 6, if a leftward external force F in the figure acts on the fastening parts 121, 121 which fasten the secondary battery cell 1 at both ends to the battery module or vehicle, a leftward force acts on the battery body 11 as well. At this time, the power generation unit 112 which is sealed in the battery body 11 is held only by the joining of the positive terminal 114 or negative terminal 115 to the outer periphery portion 113 of the case member 111, and the frictional force between the power generation unit 112 and the case member 111 created by vacuum in the case member 111. Therefore, if the external force F acting on the fastening parts 121, 121 is transmitted as it is to the battery body 11, a rightward inertial force with respect to the external force F acts on the power generation unit 112 which is sealed inside so that a relative displacement occurs between the power generation unit 112 and the case member 111. Consequently, the current collectors 112d, 112g are subject to deformation likely to lead to mechanical deterioration of the battery.

However, in the secondary battery cell 1 in the present embodiment, as shown in FIG. 6, the case member 111 of the battery body 11 and the spacer 12 are connected by the elastic resin part 13, and the battery body 11 is supported through the elastic resin part 13 at both ends of the battery body 11. Thus, as shown in FIG. 6, if a leftward external force F acts on the fastening part 121 of the spacers 12, buffering forces f1 to f3 counter acting the external force F which is about to act on the battery body 11 are generated at both elastic resin parts 13, 13 so that a force received per unit time will be reduced. Consequently, the displacement between the power generation unit 112 and the case member 111 is suppressed and mechanical degradation of the battery due to deformation of the current collectors 112d, 112g can be suppressed. That is, it is possible to buffer external force which is applied to the battery body 11. The stability of the fastened state of the battery body 11 is also improved. In particular, the elastic resin part 13 is superior in external force buffering property due to elastic force in response to a relatively high frequency vibration such as a vehicle vibration.

Figure 7:
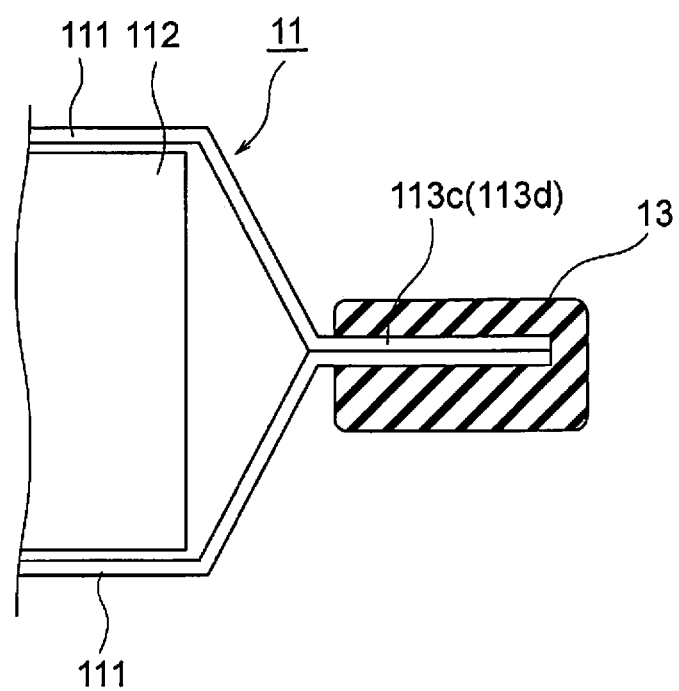
FIG. 7 is a cross-sectional view along of the line VII-VII in FIG. 1.

In contrast to this, the elastic resin part 13 formed in the range H2 in FIG. 2, as shown in FIG. 7, is formed over the entire range of the outer periphery portions 113c, 113d in the state surrounding the end surface of a pair of case members 111, 111. FIG. 7 is a cross-sectional view along the line VII-VII in FIG. 1. By forming the elastic resin parts 13 along the entire length of the outer periphery portions 113c, 113d, it is possible to prevent electric leakage of potential from the power generation unit 112 from the joined surfaces of the outer periphery portions 113c, 113d. Further, by connecting the elastic resin part 13 formed in the range H1 and the elastic resin part 13 formed in the range H2, it is possible to cause part of the external force F applied to the spacer 12 to diffuse or disperse to the elastic resin part 13 formed in the range H2. Therefore, it is possible to alleviate the external force transmitted to the battery body 11.

The hardness of the elastic resin part 13 formed in the range H1 is preferably smaller than the hardness of the outside resin layer 111c which forms the case member 111 of the battery body 11 and also smaller than the hardness of the spacer 12. This is because if application of the external force F causes a remarkably excessive external force to act on the spacer 12 and causes the elastic resin part 13 and the case member 111 to initially contact, if the hardness of the elastic resin part 13 is high, the case member 111 will be damaged. The degree of resin hardness of the elastic resin part 13 can be adjusted by the type of plastic material which is employed.

Figure 8:
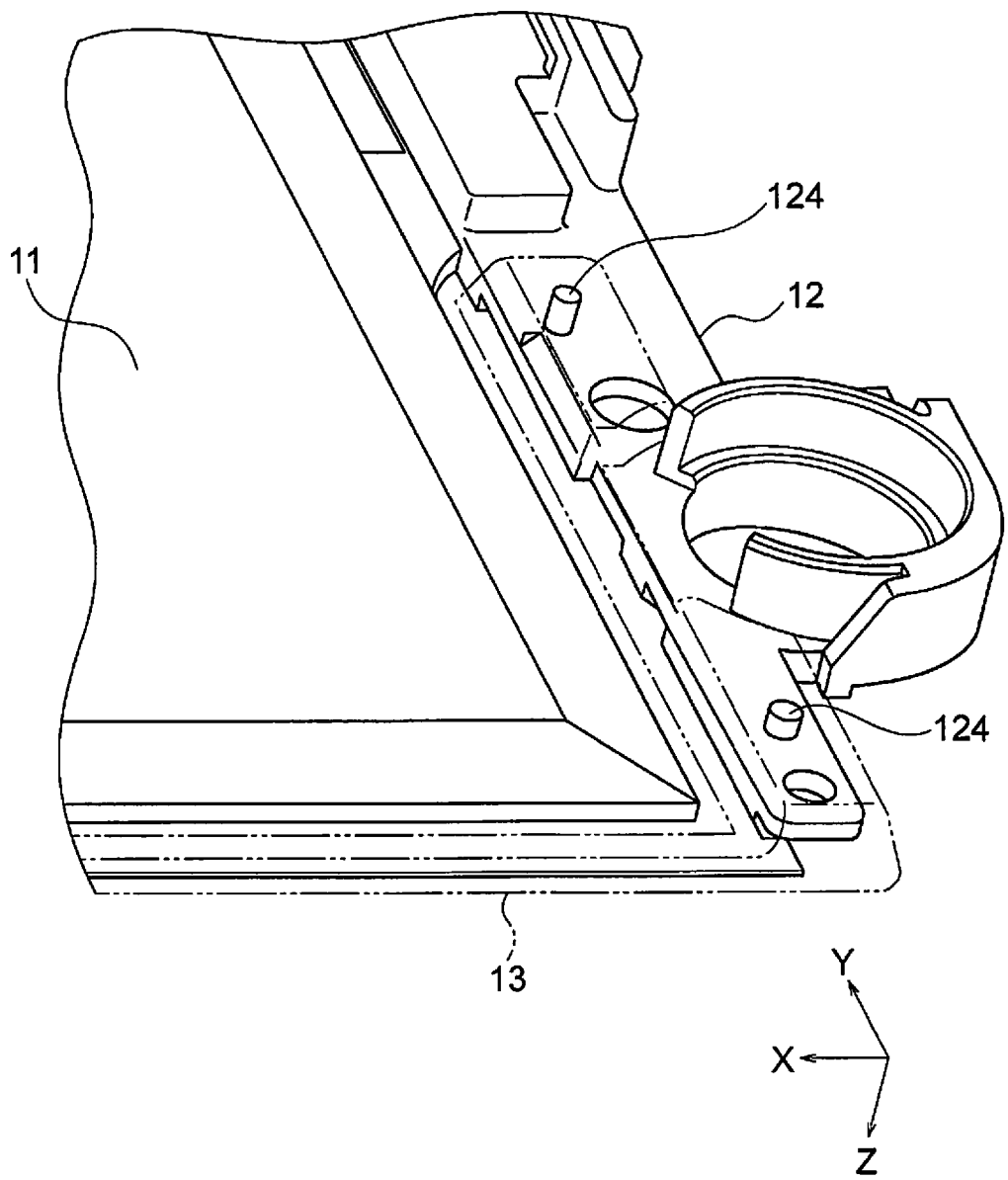
FIG. 8 is a view along the arrow VIII in FIG. 1.
Figure 9:
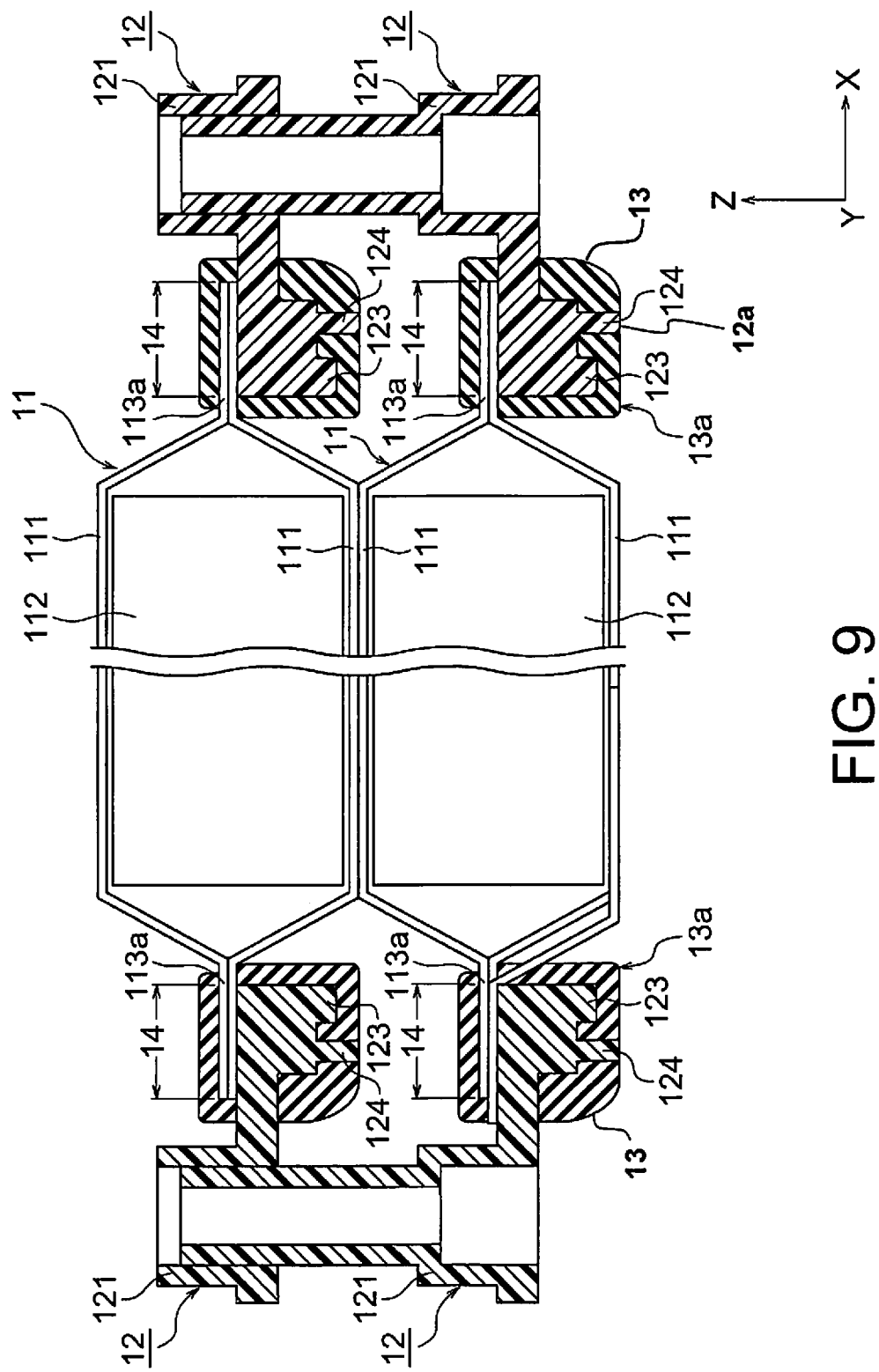
FIG. 9 is a cross-sectional view along the line IX-IX in FIG. 1.

Further, as shown in FIG. 8 and FIG. 9, projection 124 is formed at the bottom surface of the spacer 12, which projects or protrudes downward with respect to the stacking direction of the batteries. FIG. 8 is a view along the arrow VIII in FIG. 1, while FIG. 9 is a cross-sectional view along the line IX-IX in FIG. 1. The projection 124, as explained below, is a member abutting against a eject pin when producing the secondary battery cell 1 of the present example. The surfaces of the tip part of the projections 124 is exposed from the bottom surface of the elastic resin part 13. The projection 124 is formed in cylindrical shape and is formed such that the center lines of the cylindrical shape (line connecting center points of top and bottom surfaces of circular shapes) become parallel to the stacking direction of battery bodies 11.

As described above, the spacer 12 have main surfaces which are parallel to the main surface of the battery body 11 for joining with the battery body 11 at the outer periphery portion 113a of the battery body 11. The projection 124 is formed extending from the member including the main surface of the spacer 12 in a direction vertical to the main surfaces (i.e., in the thickness direction of the flat battery body 11) and protrudes toward the outside of the elastic resin part 13. The side surface of the projection 124 is embedded or buried in the elastic resin part 13. However, the bottom surfaces of the projections 124 are exposed from the elastic resin parts 13. Therefore, the tip part of the projection 124 including the bottom surfaces are covered by the elastic resin parts 13 except at the bottom surface. Further, the elastic resin part 13 has an end surface 13a configured to cover the spacer 12 from below and to extend along the vertical direction perpendicular to the stacking direction of the battery body 11 (thickness direction of flat battery body 11). The bottom surface of the projection 124 is exposed in circular shape from part of the end surfaces 13a of the elastic resin part 13. That is, the circular bottom surface part representing the tip of the projection 124 corresponds to the exposed part exposed from the elastic resin part 13.

Although detailed below, in a production process of a secondary battery cell 1, after injecting a molten elastomer in a cavity of a mold, a step is involved in which the elastic resin part 13 is separated from the mold. In this step, when separating the elastic resin part 13 by using an eject pin, in order to separate from mold by contacting the eject pin to the elastic resin part 13, the eject pin is only used after the elastic resin part has completely solidified. On the other hand, in the secondary battery cell 1 of the present embodiment, as described above, the spacer 12 is provided with the exposed part exposed from part of the lower end surface, in the mold separating process, prior to complete solidifying of the elastic resin part 13, the elastic resin part may be separated by contacting the eject pin the exposed part. Consequently, it is possible to shorten the production time for the secondary battery cell.

Next, a method for producing the secondary battery 1 according to the preset invention will be described. First, the power generation unit 112 is fitted inside the case member 111 of the laminate films and filled with electrolyte liquid. Then, the outer periphery portion 113 of the case member 111 is sealed. Thus, a battery body 11 is obtained. In parallel with this process, a spacer with a fastening part 121, a through hole 122, and a rib 123 is formed to prepare a spacer 12.

Figure 10:
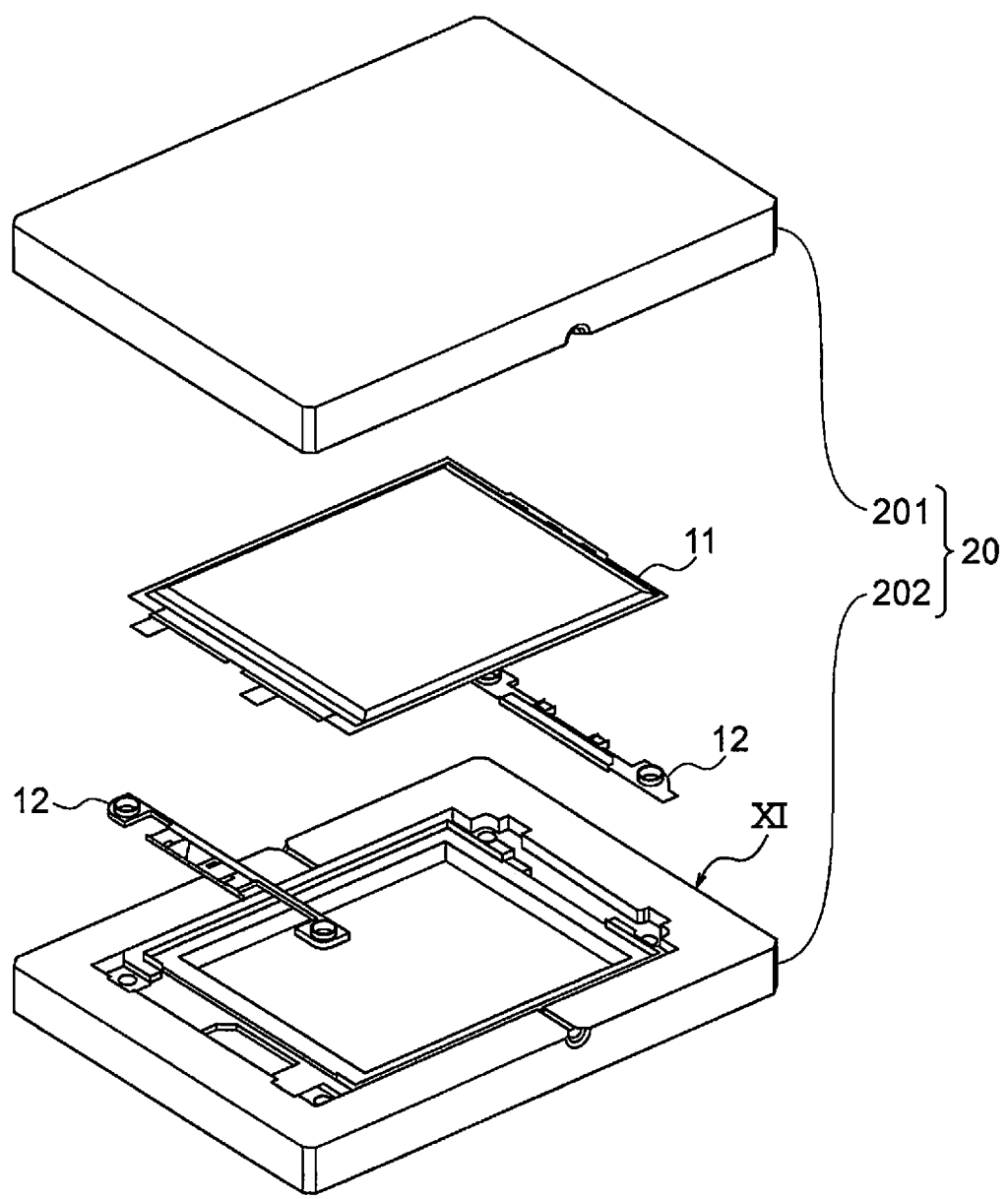
FIG. 10 is a perspective view which shows a state in which the battery body and spacers shown in FIG. 1 are set in a mold.

Next, as shown in FIG. 10, the battery body 11 and spacer 12 are set in the mold 20. FIG. 10 is a perspective view which shows the state in which the battery body 11 and spacers 12 are set in the mold 20. The mold 20 is an injection molding mold which is formed by a pair of a molding die 201 and a molding die 202 for clamping the battery body 11 and the spacers 12.

Figure 11:
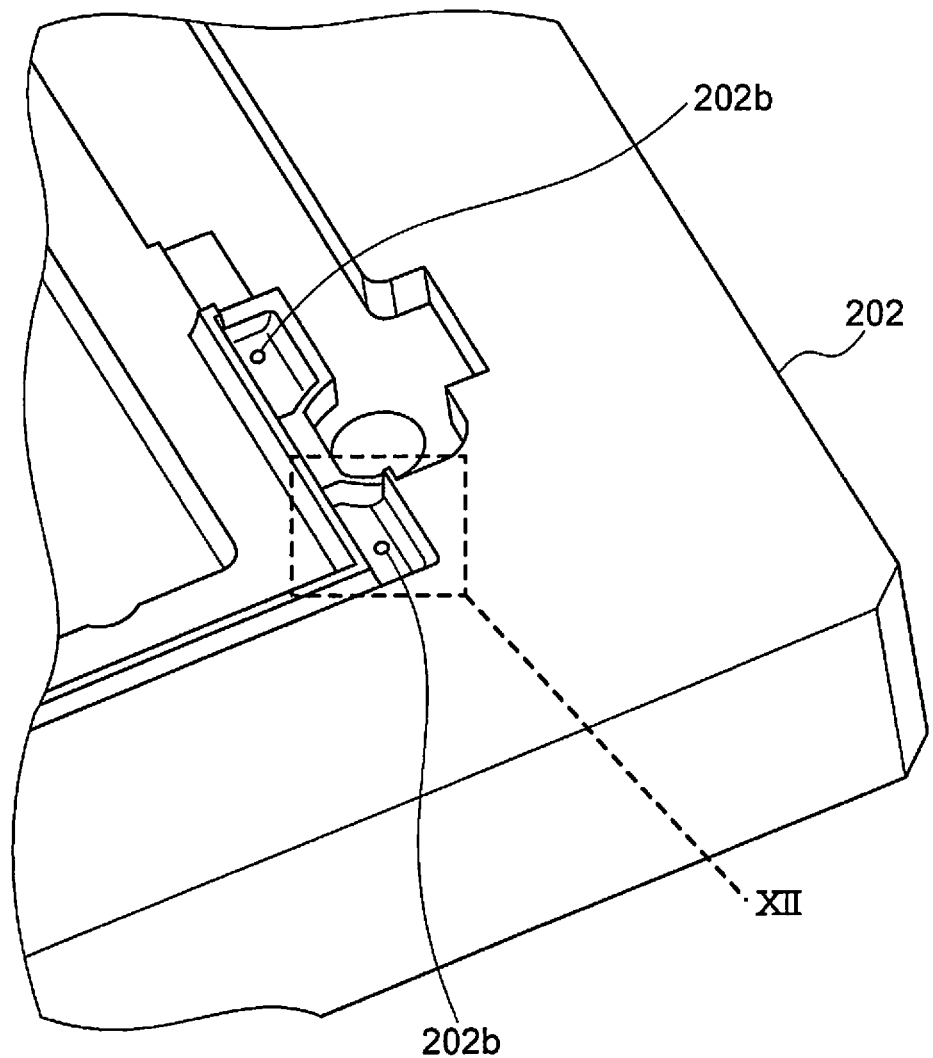
FIG. 11 is a view along the arrow XI in FIG. 10.
Figure 12:
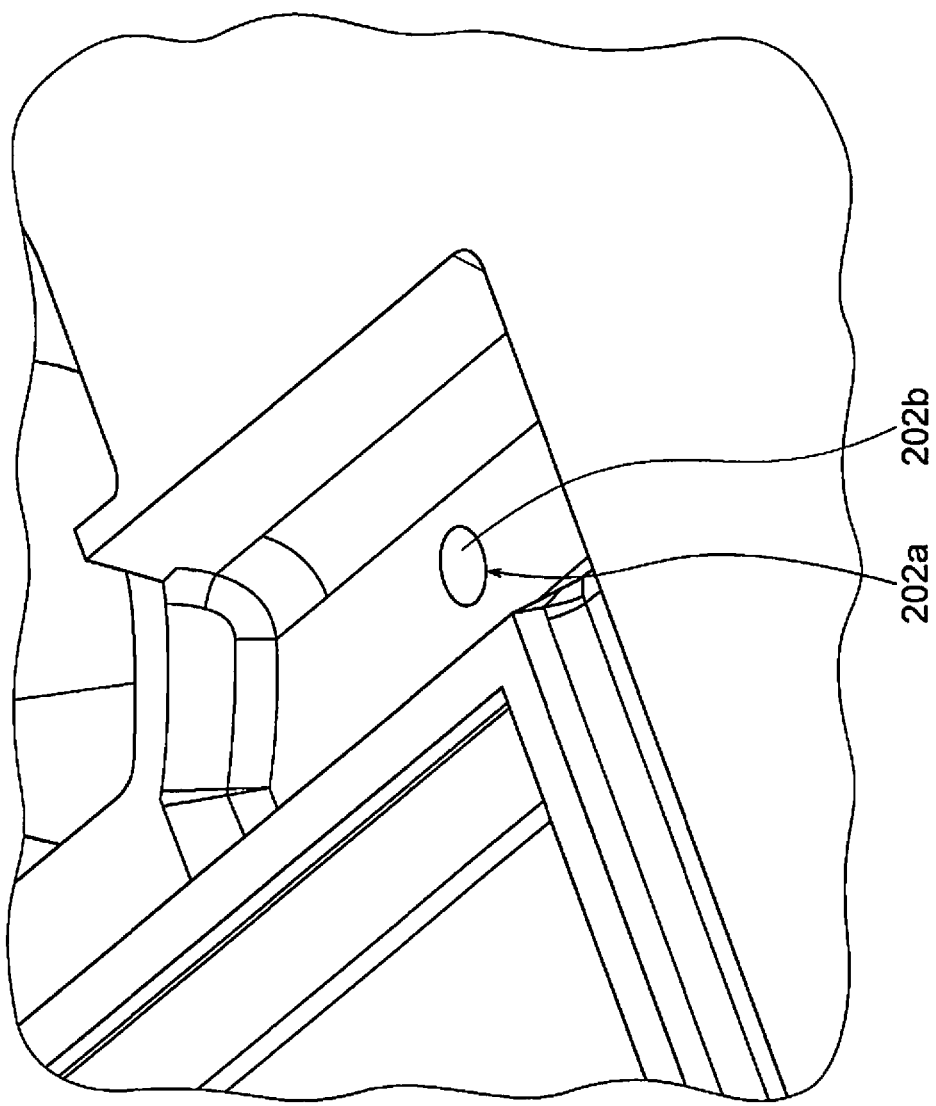
FIG. 12 is an enlarged view of a part XII in FIG. 11.

Now, the configuration of the molding die 202 will be described with reference to FIGS. 11 and 12. FIG. 11 is a view along the arrow XI in FIG. 10 while FIG. 12 is an enlarged view of part XII of FIG. 11. As shown in FIG. 11 and FIG. 12, the mold die 202 is provided with an insertion hole 202a for insertion of an eject pin 202b. The insertion hole 202a is, after the spacer 12 has been set in the forming die 202, provided at a position at which the lower surface of the projection 124 contacts and penetrate through the bottom surface of the molding die 202. The periphery part of the insertion hole 202a does not contact the spacer 12. The tip end surface of the eject pin 202b is flush with the surrounding portions.

Figure 13:
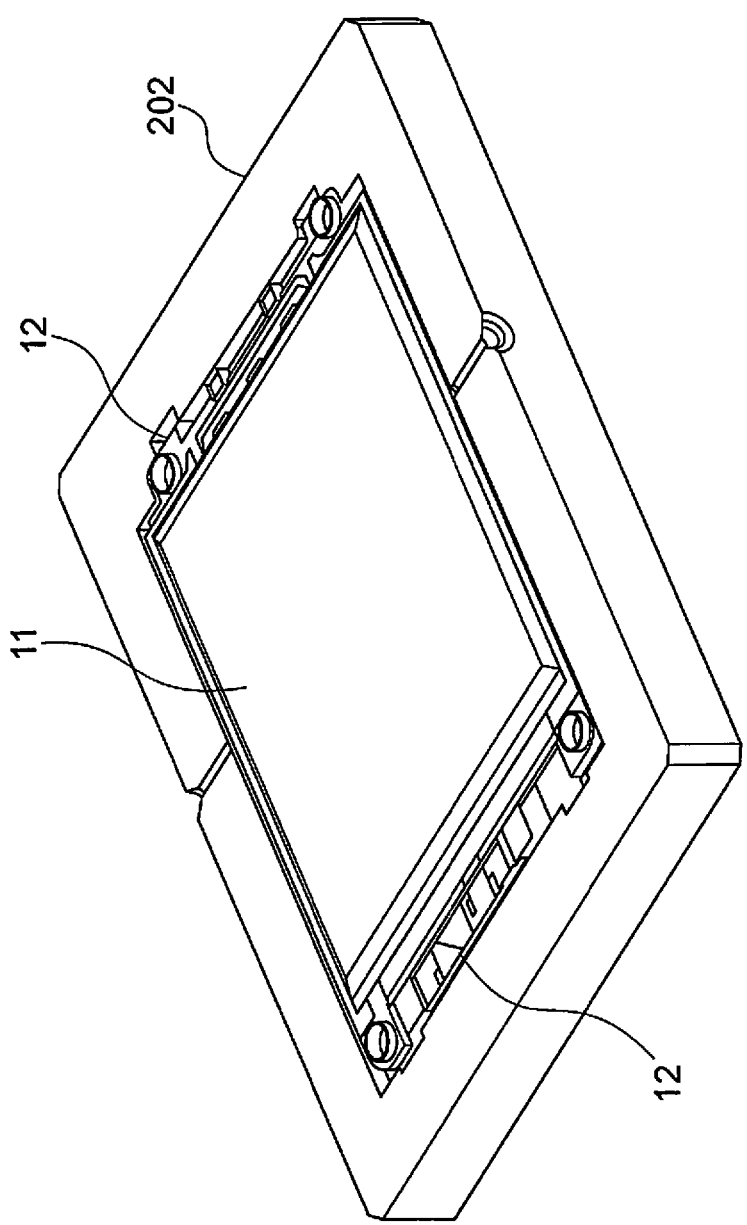
FIG. 13 is a perspective view which shows a state in which the battery body and spacer shown in FIG. 10 is set in a mold.
Figure 14:
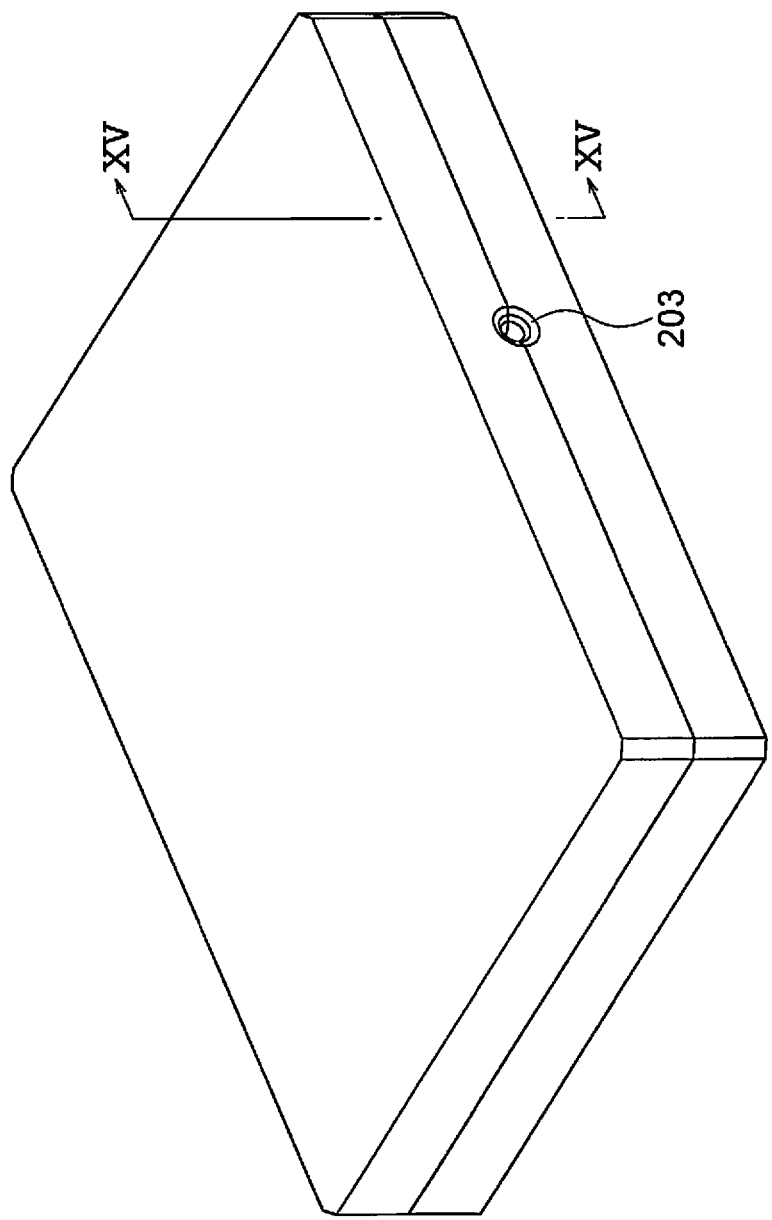
FIG. 14 is a perspective view which shows a state in which battery body 11 and spacer 12 in FIG. 10 is fastened by a mold 20.

FIG. 13 is a perspective view which shows a state in which the battery body 11 and the spacer 12 are set in the mold die 202, while FIG. 14 is a perspective view which shows a state in which both the battery body 11 and the spacer 12 are clamped between the mold dies 201, 202. As shown in FIG. 13, while the bottom surface of the projection 124 is positioned at the tip end part of the eject pin 202b, both the battery body 11 and the spacer 202 are accommodated in the molding die 22. At this time, the spacer 12 is set so as to superposed on the outer periphery portion 113a of the battery body 11. Subsequently, as shown in FIG. 14, the molding die 201 and the molding die 202 are clamped to hold the battery body 11 and spacers 12 in the mold.

Figure 15:
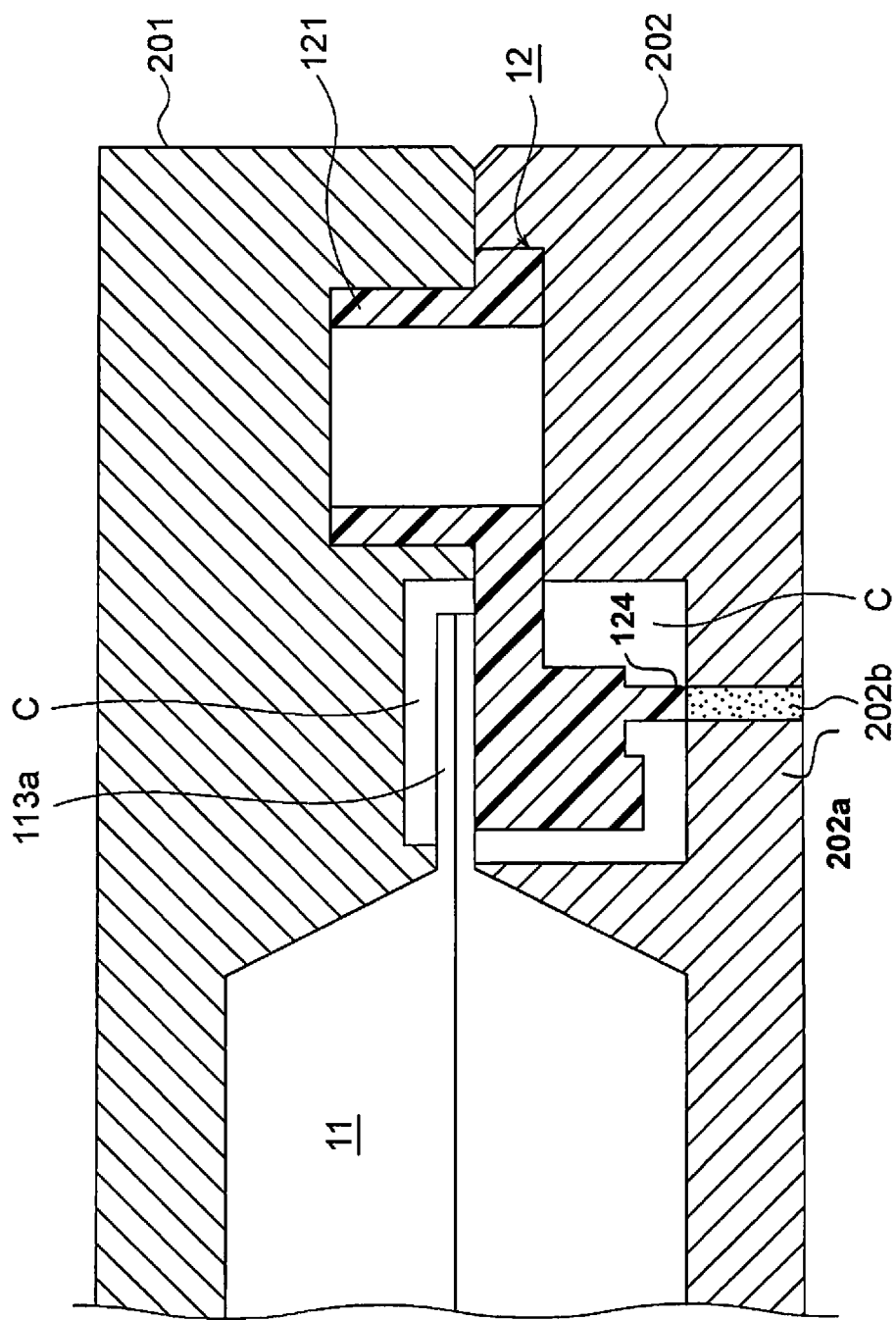
FIG. 15 is a cross-sectional view along the line XV-XV in FIG. 14.

Now, the battery body 11 and spacer 12 in mold in the clamped state is described with reference to FIG. 15. FIG. 15 is a cross-sectional view along the line XV-XV in FIG. 14. As shown in FIG. 15, when the spacer 12 is set in the mold dies 201, 202 and the mold is closed, no cavity (C) is formed between the bottom surface of the projection 124 and the tip end part of the eject pin 202b. Meanwhile, cavities are formed between the surroundings of the bottom surfaces of the projection 124 and the surface of the molding die 202.

Subsequently, molten resin is injected from the injection port 203 to fill the cavity with molten resin to form an elastic resin part. Thus, the elastic resin part 13 covers the spacers 12 and the outer periphery portion 113a of the battery body 11 at the connecting parts of the battery body 11 and the spacer 12 while exposing the bottom surface of the projection 124.

Figure 16:
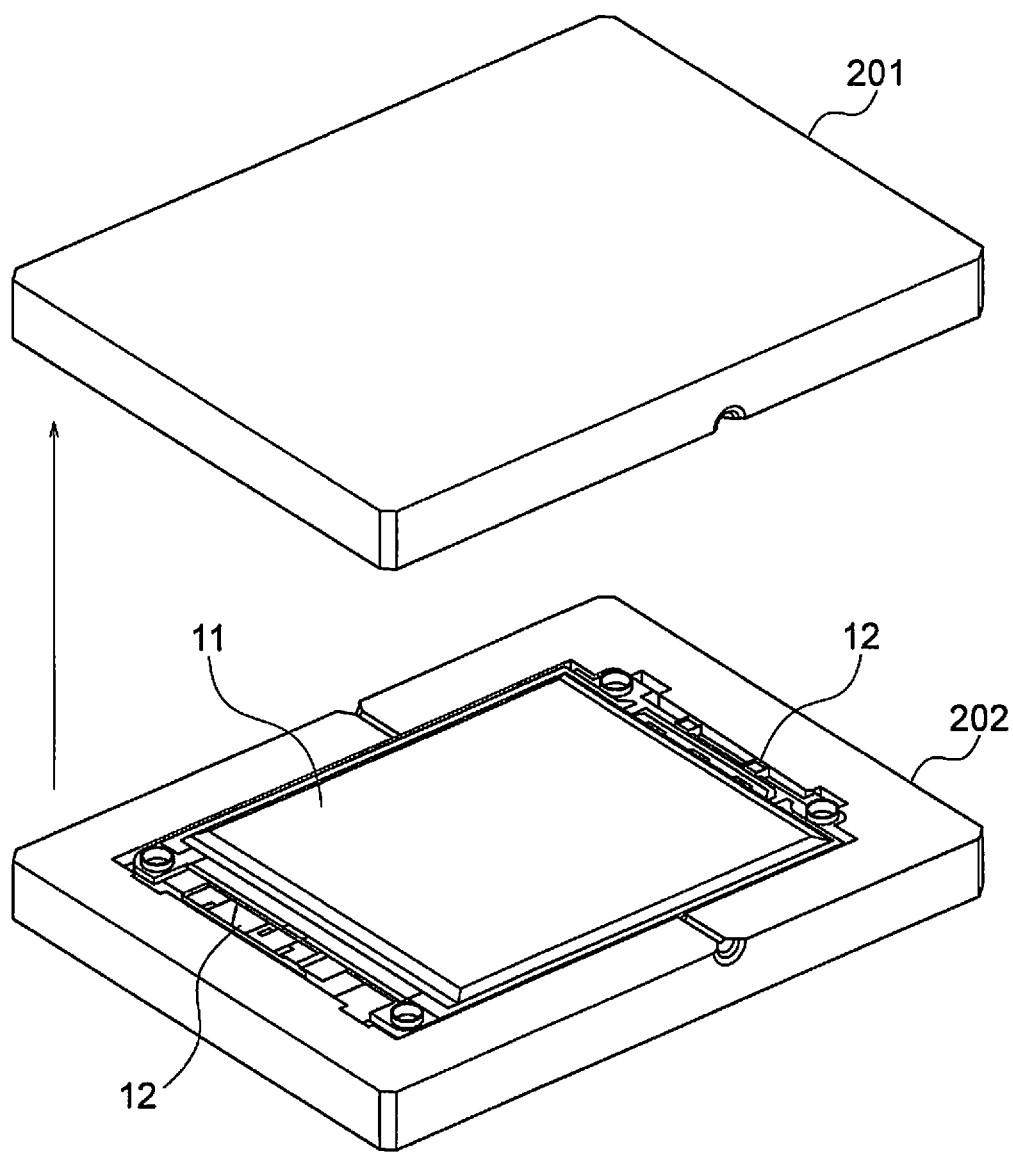
FIG. 16 is a perspective view which shows a state in which the mold of FIG. 14 is opened.
Figure 17:
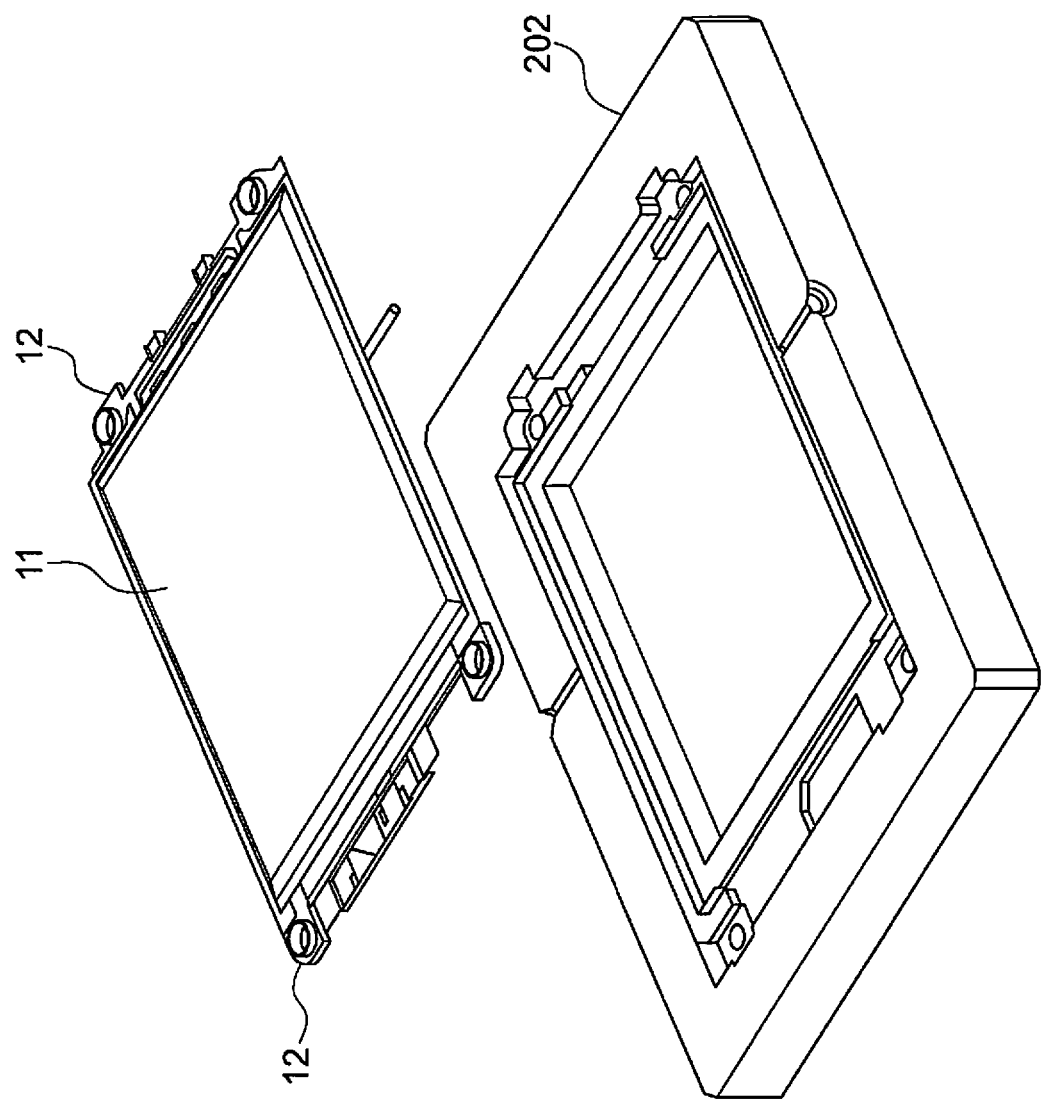
FIG. 17 is a perspective view which shows a state in which a battery body, the pacer, and the elastic resin part are taken out from the mold in FIG. 16.

Next, as shown in FIG. 16 and FIG. 17, the molding dies 201, 202 are opened and the eject pin 202b is used to remove the battery structure which has the battery body 11, the spacer 12, and elastic members 13. FIG. 16 is a perspective view which shows a state where the mold 20 is opened, while FIG. 17 is a perspective view which shows a state of taking out the battery body 11, the spacer 12, and the elastic resin part 13 from the mold die 202. In this battery structure, the eject pin 202b is pushed up from the hole at the bottom surface of the insertion hole 202a to push up the bottom surface of the projection 124 by the eject pin 202b before the elastic resin part 13 completely cures. Thus, the spacers 12 are stick out in the direction releasing them from the mold plate 202 and are removed.

When taking out the battery structure from the mold die 202, the elastic member 13 has not yet completely cured and the elastic member 13 may stick to the surface of the mold die 202. In the present embodiment, since the eject pin 202b pushes the bottom surfaces of the projecting 124 of the spacer 12, even if the elastic member 13 is not completely cured, the battery structure can be pushed up. Unlike the present embodiment, the case may also be conceivable where the spacer 12 is pushed up by the eject pins 202b at the portion other than the projection 124 and not covered by the elastic resin part 13. However, in such a case, the part of contact with the eject pin 202b and in the vicinity thereof, no adherence with the molding die 202 so that the stress is applied on these non-adhesion area with applying load unevenly on the non-adhesion area between the molding die 303 and the elastic resin portion 13, it is difficult to remove the battery structure without causing deformation. On the other hand, in the present embodiment, since the vicinity part of the area of contact with the eject pin 202a is a boundary between the elastic member 13 and the molding die 202, uneven application of the load with respect to the adhesion area between the molding die 202 and the elastic resin part 13.

As described above, according to the secondary battery cell 1 of the present example, at the outer periphery portion of the battery body 11, since the battery body 11 and the spacer 12 are connected by an elastic resin part 13, as shown in FIG. 6, when an external force F is applied through the spacer 12 to the battery body 11, a buffering force f3 is generated at the elastic resin part 13 themselves. Thus, the external force which is applied to the battery body 11 can be buffered and the stability of the fastened state of the battery body 11 is improved. In particular, the secondary battery cell is superior in action in buffering against external force by the elastic force of the elastic resin part 13 in the case of vibration of a relatively high frequency such as vehicular vibration.

Further, in the present embodiment, the spacers 12 is partly covered by the elastic resin parts 13. In addition, the elastic resin part 13 is formed with an end surface 13a in a direction vertical to the stacking direction of the battery bodies 11. The spacer 12 comprises an exposed part are exposed from part of the end surfaces. Further, in the present embodiment, the battery body 11 and spacer 12 are set in the mold dies 201, 202 provided with the through holes 202a then the mold is clamped and the battery body 11 and the spacers 12 are integrally joined by the elastic resin parts 13. When removing the battery body 11, the spacer 12, and elastic resin part 13 from the mold die 202, the exposed part is pushed by the eject pin 202b which is inserted in the through hole 202a. Thus, when taking out the battery structure from the molding die 202, it is possible to make the eject pins 202b abut against the exposed part of the spacer 12 without abutting against the elastic resin part 13. As a result, it is possible to prevent deformation of the elastic resin part 13 while shortening the production process.

Further, in the present embodiment, the battery body 11, spacer 12, and elastic resin part 13 are removed from the mold 20 before the elastic resin part 13 completely solidifies. Thus, the production process can be shortened.

Further, since the hardness of the elastic resin part 13 formed in the range H1 is smaller than the hardness of the outside resin layer 111c which forms the case member 111 of the battery body 11, and is further smaller than the hardness of the spacer 12. Thus, when a remarkably excessive external force acts on the spacer 12 and the elastic resin part 13 and the case member 111 contact each other, it is possible to suppress scratching of the case member 111 by the elastic resin parts 13.

Further, due to the elastic resin part 13 formed in the range H2, it is possible to block electric leakage of potential from the power generation unit 112 which is about to leak from the joined surfaces of the outer periphery portions 113c, 113d, and it is possible to suppress a capacity drop of the secondary battery cell 1. Further, the elastic resin part 13 formed in the range H1 and elastic resin parts 13 formed in the range H2 are connected each other. Thus, it is possible to direct part of the external force F which is applied to the spacer 12 to the elastic resin part 13 formed in the range H2. Therefore, it is possible to alleviate the external force transmitted to the battery body 11.

Further, by forming the elastic resin part 13 by insert molding, it is possible to reduce the production time and number of manufacturing steps. Thus it is possible to lower the cost of the secondary battery cell 1.

Figure 18:
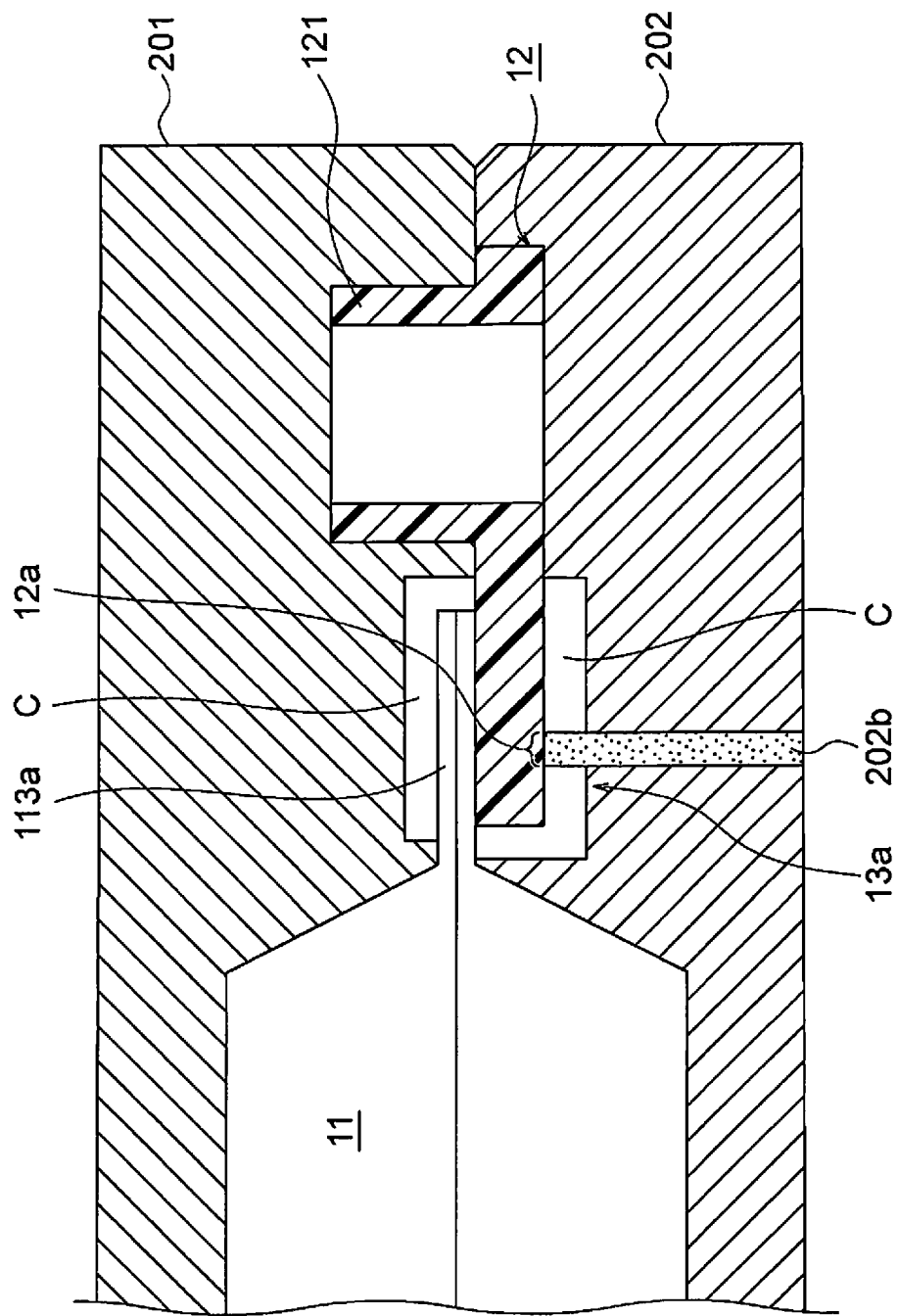
FIG. 18 is a partial cross-sectional view of a secondary battery cell in a modification according to the present invention.
Figure 19:
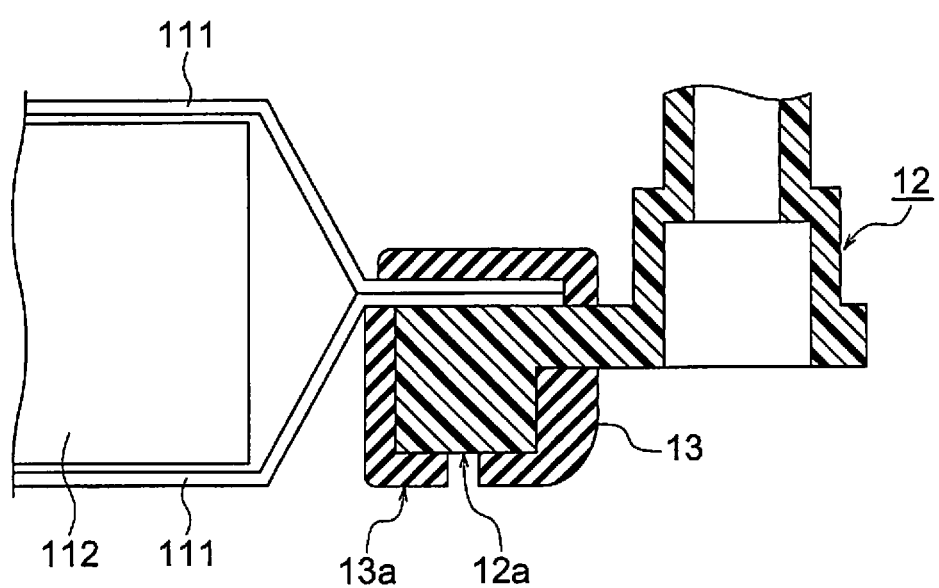
FIG. 19 is a partial cross-sectional view of a secondary battery cell according in another modification according to the present invention.

Note that, in the present embodiment, the spacer 12 is not necessarily required to be formed with a projection 124. Also, as shown in FIG. 19, part of the lower surface of the spacer 12 may be used as an exposed part 12a. FIG. 18 is a partial cross-sectional view of a secondary battery cell 1 in a modified embodiment according to the present invention and corresponds to a cross-sectional view along the line XV-XV in FIG. 14. FIG. 19 is a partial cross-sectional view of a secondary battery cell 1 in another modified embodiment according to the present invention and corresponds to a cross-sectional view along the line IX-IX in FIG. 1. As shown in FIG. 18, a part of the eject pin 202b projects out from the surface which forms the cavity C of the molding die 202. The tip end part of the eject pin 202b abuts against the bottom surfaces of the spacer 12. The bottom surface of the spacer 12 other than the exposed part 12a which the eject pins 202b abut against is separated from the molding die 202 by a certain distance and forms the cavity C. In the state of FIG. 18, an elastic resin part 13 is filled in the cavity C and the similar steps to those described above are performed, the secondary battery cell 1 shown in FIG. 19 is formed. That is, the part of the bottom surface of the spacer 12 which the eject pin 202b abuts against becomes the exposed part 12a which is exposed from the end surface 13a of the elastic resin part 13, while the part which the eject pin 202b does not contact is covered by the elastic resin part 13. Thus, when taking out a battery structure from the molding die 202, it is possible to cause the eject pins 202b to abut against the exposed part 12a of the spacer 12 without abutting against the elastic resin part 13. As a result, deformation of the elastic resin part 13 can be prevented while the production process can be shortened.

Note that, in the present embodiment, the projection 124 is not necessarily have to be formed in a cylindrical shape. For example, it may also be formed into a trigonal pyramid, a quadrangular pyramid, or other pyramidal shapes, or may be formed into a conical shape. Further, it may also be formed into prismatic shapes with bottom surfaces of triangular, rectangular, or other polygonal shapes.

Figure 20:
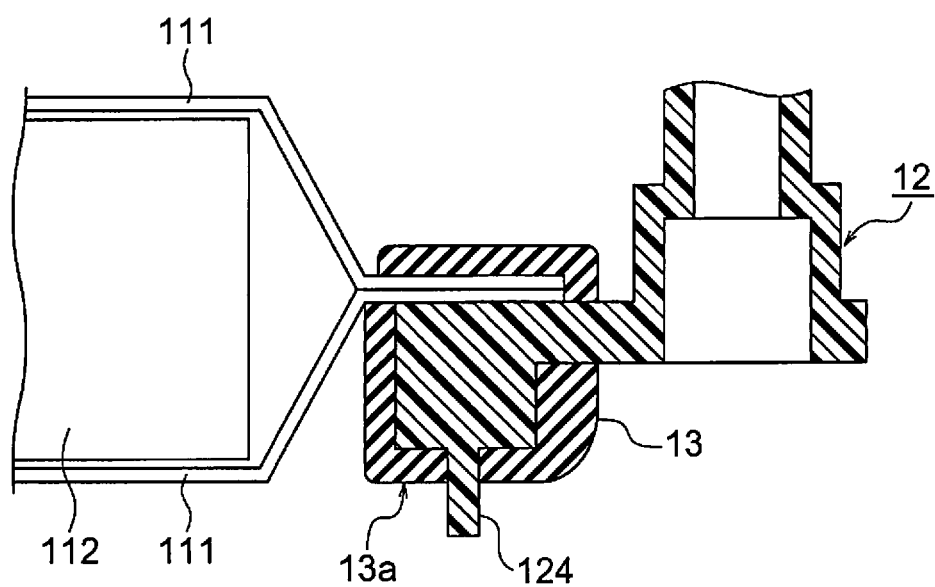
FIG. 20 is a partial cross-sectional view of a secondary battery cell in still the other modification according to the present invention.
Figure 21:
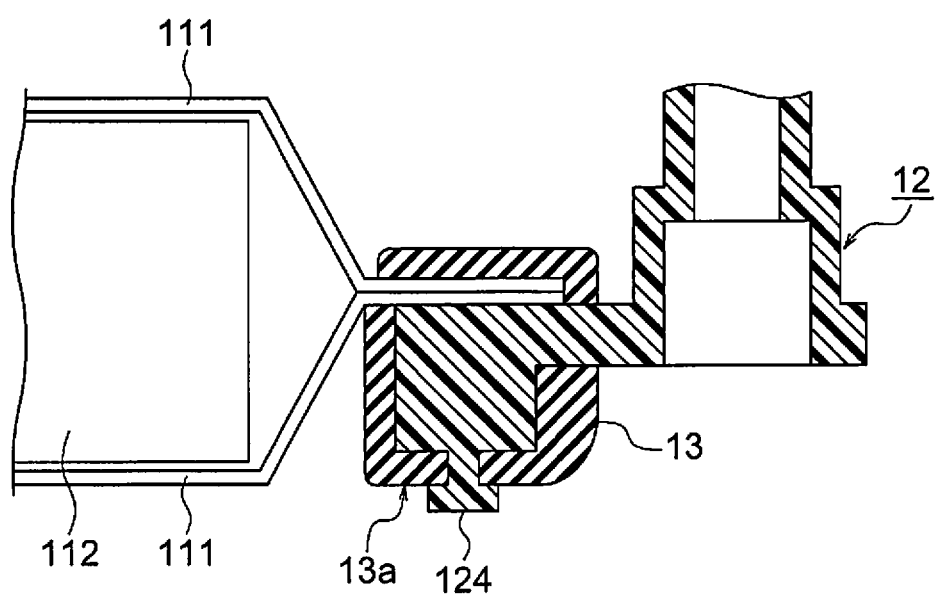
FIG. 21 is a partial cross-sectional view of a secondary battery cell in the modification according to the present invention.

Further, in the present example, the projection 124 does not have to be formed to be flush with the end surface 13a of the elastic resin part 13. As shown in FIG. 20, the projection 124 may also be formed such that the tip end part of the projection 124 may be configured to extend further from the end surface 13a of the elastic resin part 13 outwardly so as to project from the tip end surface 13a of the elastic resin part 13. FIG. 20 is a partial cross-sectional view of a secondary battery cell 1 according to a further modification of the present invention and corresponds to a cross-sectional view along IX-IX in FIG. 1. Furthermore, in the present embodiment, the projection 124 projecting from the end surface 13a of the elastic resin part 13 in FIG. 20 may be crushed by a previously heated eject pin 202b so that the tip end portion of the projection 124 forms a larger part than the projection part 123 penetrating the elastic resin part 13, as shown in FIG. 21. Thus, the elastic resin part may be prevented from being separate from the spacer 12.

Further, in the present embodiment, it is also possible to cause an end containing a surface which is parallel with the end surface 13 to be exposed from the end surface 13a so as to form the rib 123 as the projection 124. In addition, with respect to the projection 124 or the spacer 12, the part exposed from the end surface 13a of the elastic resin part 13 is not necessarily have to be formed on the lower surface side of the spacer 12, but may be formed on the upper surface side of the spacer 12.

Note that the mechanical strength of the spacer 12 may be made larger than the mechanical strength of the electrode plate of the power generation unit 112. Thus, if a remarkably excessive external force acts on the spacer 12 and the spacer 12 and power generation unit 112 contact each other whereby both components would be crushed, since the spacer 12 is formed to be crush-resistance, the holding stability of the secondary battery cell 1 can be secured.

The spacer 12 corresponds to the "plate-shaped member" in the present invention, the elastic resin part 13 corresponds to the "elastic member" in the present invention, and the tip end part of the projection 124 and exposed from the elastic resin part 13 corresponds to the "exposed part" in the present invention.

The invention claimed is:

1. A flat battery comprising:
   a battery body including a power generation unit and a case member encasing and sealing the power generation unit therein;
   a plate-shaped member configured to be disposed between an outer periphery portion of the battery body and an outer periphery portion of an adjacent battery body that is to be stacked on the battery body; and
   an elastic member respectively connected to the battery body and to the plate-shaped member to connect the battery body and the plate-shaped member, and covering at least part of the plate-shaped member,
   the plate-shaped member including an exposed part which is exposed through part of an end surface of the elastic member which covers the plate-shaped member in a thickness direction of the battery body without passing through the battery body, a perimeter of the exposed part being entirely surrounded by the elastic member, the plate-shaped member including a fastening part configured to be connected to a corresponding fastening part of an adjacently disposed plate-shaped member, and the elastic member is softer than the plate-shaped member.

2. The flat battery as set forth in claim 1, wherein
the plate-shaped member has a projection which projects outwardly from a part which is covered by the elastic member toward an outside of the elastic member, and
the exposed part is formed by a front tip end of the projection.

3. The flat battery as set forth in claim 1, wherein
the fastening part fastens the battery body in a predetermined position.

4. The flat battery as set forth in claim 1, wherein
the case member seals the power generation unit inside by superposing outer peripheral portions of two film-shaped members and entirely joining the outer peripheral portions of the film-shaped members to form a joined part, and
the outer peripheral portion forms at least part of the joined part.

5. The flat battery as set forth in claim 4, wherein
each of the film-shaped members is a laminate film member which includes a resin layer defining an exterior surface side of the battery, and
the elastic member is softer than the resin layer.

6. The flat battery as set forth in claim 1, wherein
the elastic member is an elastic resin that is insert molded in a region surrounding overlapping parts of the battery body and the plate-shaped member.

7. A method for producing the flat battery of claim 1 comprising:
sealing the power generation unit inside of the case member to obtain the battery body;
preparing the plate-shaped member to be connected to the outer periphery portion of the battery body;
setting the battery body and the plate-shaped member in a mold which is provided with a through hole and clamping the mold;
integrally joining the battery body and the plate-shaped member with the elastic member in a state with part of the plate-shaped member in the thickness direction of the battery body being exposed without passing through the battery body, the perimeter of the exposed part being entirely surrounded by the elastic member, the plate-shaped member including the fastening part configured to be connected to the corresponding fastening part of the adjacently disposed plate-shaped member; and removing the battery body, the plate-shaped member, and the elastic member from the mold by pushing the exposed part of the plate-shaped member, which is exposed through the elastic member, by inserting an eject pin into the through hole.

8. The method for producing of a flat battery as set forth in claim 7, wherein
the removing of the battery body, the plate-shaped member, and the elastic member from the mold is performed before the elastic member completely cures.

9. The method for producing a flat battery as set forth in claim 7, wherein
the setting of the plate-shaped member in the mold includes overlapping the plate-shaped member with the outer periphery portion of the battery body; and
the joining of the battery body and the plate-shaped member by insert molding that includes filling an elastic resin in a region surrounding overlapping parts of the battery body and the plate-shaped member.

10. The method for producing a flat battery as set forth in claim 8, wherein
the setting of the plate-shaped member in the mold includes overlapping the plate-shaped member with the outer periphery portion of the battery body; and
the joining of the battery body and the plate-shaped member by insert molding that includes filling an elastic resin in a region surrounding overlapping parts of the battery body and the plate-shaped member.

11. The flat battery as set forth in claim 2, wherein
the fastening part fastens the battery body in a predetermined position.

12. The flat battery as set forth in claim 2, wherein
the case member seals the power generation unit inside by superposing outer peripheral portions of two film-shaped members and entirely joining the outer peripheral portions of the film-shaped members to form a joined part, and
the outer peripheral portion forms at least part of the joined part.

13. The flat battery as set forth in claim 12, wherein
each of the film-shaped members is a laminate film member which includes a resin layer defining an exterior surface side of the battery, and
the elastic member is softer than the resin layer.

14. The flat battery as set forth in claim 2, wherein
the elastic member is softer than the plate-shaped member.

15. The flat battery as set forth in claim 2, wherein
the elastic member is an elastic resin that is insert molded in a region surrounding overlapping parts of the battery body and the plate-shaped member.

16. The flat battery as set forth in claim 3, wherein
the case member seals the power generation unit inside by superposing outer peripheral portions of two film-shaped members and entirely joining the outer peripheral portions of the film-shaped members to form a joined part, and
the outer peripheral portion forms at least part of the joined part.

17. The flat battery as set forth in claim 16, wherein
each of the film-shaped members is a laminate film member which includes a resin layer defining an exterior surface side of the battery, and
the elastic member is softer than the resin layer.

18. The flat battery as set forth in claim 3, wherein
the elastic member is softer than the plate-shaped member.

19. The flat battery as set forth in claim 3, wherein
the elastic member is an elastic resin that is insert molded in a region surrounding overlapping parts of the battery body and the plate-shaped member.

* * * * *